(12) United States Patent
Aotsuka

(10) Patent No.: US 7,683,951 B2
(45) Date of Patent: *Mar. 23, 2010

(54) SOLID-STATE IMAGING APPARATUS AND DIGITAL CAMERA FOR WHITE BALANCE CORRECTION

(75) Inventor: Yasuo Aotsuka, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 990 days.

This patent is subject to a terminal disclaimer.

(21) Appl. No.: 10/828,309

(22) Filed: Apr. 21, 2004

(65) Prior Publication Data

US 2004/0233298 A1 Nov. 25, 2004

(30) Foreign Application Priority Data

Apr. 22, 2003 (JP) .......................... P. 2003-117136

(51) Int. Cl.
  H04N 3/14 (2006.01)
  H04N 5/335 (2006.01)
  H04N 9/04 (2006.01)
  H04N 9/083 (2006.01)
  H04N 9/73 (2006.01)

(52) U.S. Cl. ................... 348/275; 348/224.1

(58) Field of Classification Search ........... 348/275, 348/223.1, 224.1, 225.1, 266, 272, 273, 278, 348/279

See application file for complete search history.

(56) References Cited

U.S. PATENT DOCUMENTS

| | | | | |
|---|---|---|---|---|
| 4,833,525 A | * | 5/1989 | Suzuki et al. | 348/226.1 |
| 4,918,519 A | * | 4/1990 | Suzuki et al. | 348/224.1 |
| 5,617,139 A | * | 4/1997 | Okino | 348/223.1 |
| 5,808,681 A | * | 9/1998 | Kitajima | 348/223.1 |
| 6,515,275 B1 | * | 2/2003 | Hubel et al. | 250/226 |
| 6,952,225 B1 | * | 10/2005 | Hyodo et al. | 348/223.1 |
| 7,180,629 B1 | * | 2/2007 | Nishio et al. | 348/223.1 |
| 2002/0012463 A1 | * | 1/2002 | Yamada | 382/167 |
| 2003/0058357 A1 | * | 3/2003 | Aotsuka | 348/272 |
| 2004/0100570 A1 | * | 5/2004 | Shizukuishi | 348/272 |
| 2004/0105017 A1 | * | 6/2004 | Aotsuka | 348/223.1 |
| 2005/0068433 A1 | * | 3/2005 | Aotsuka | 348/272 |
| 2005/0073592 A1 | * | 4/2005 | Aotsuka | 348/224.1 |

FOREIGN PATENT DOCUMENTS

JP 07143513 A * 6/1995

(Continued)

*Primary Examiner*—Jason Whipkey
(74) *Attorney, Agent, or Firm*—Birch, Stewart, Kolasch & Birch, LLP

(57) ABSTRACT

A solid-state imaging apparatus comprises: a solid-state imaging device having pixels that image light originating from a subject, by dividing the light into color signals; and a signal processor that subjects photographed image data output from the device to white balance correction at a gain corresponding to light source type(s). The device further comprises a sensor that detects light in a wavelength range which induces a difference having a predetermined value or more between radiant energy of a first light source and that of a second light source on the surface of the device. The processor comprises: a mixing ratio estimation unit that determines a mixing ratio between illumination light originating from the first light source and that originating from the second one, through use of a detection signal output from the sensor; and a gain computation unit that computes a gain where the white balance correction is to be effected, according to the mixing ratio.

12 Claims, 16 Drawing Sheets

FOREIGN PATENT DOCUMENTS

| | | |
|---|---|---|
| JP | 8-51632 A | 2/1996 |
| JP | 8-340542 A | 12/1996 |
| JP | 11-113005 A | 4/1999 |
| JP | 2000-102025 A | 4/2000 |
| JP | 2000-111983 A | 4/2000 |
| JP | 2000-307940 A | 11/2000 |
| JP | 2001-359109 | 12/2001 |
| JP | 2001-359109 A | 12/2001 |
| JP | 2002-135802 A | 5/2002 |
| JP | 2002-374539 A | 12/2002 |

* cited by examiner

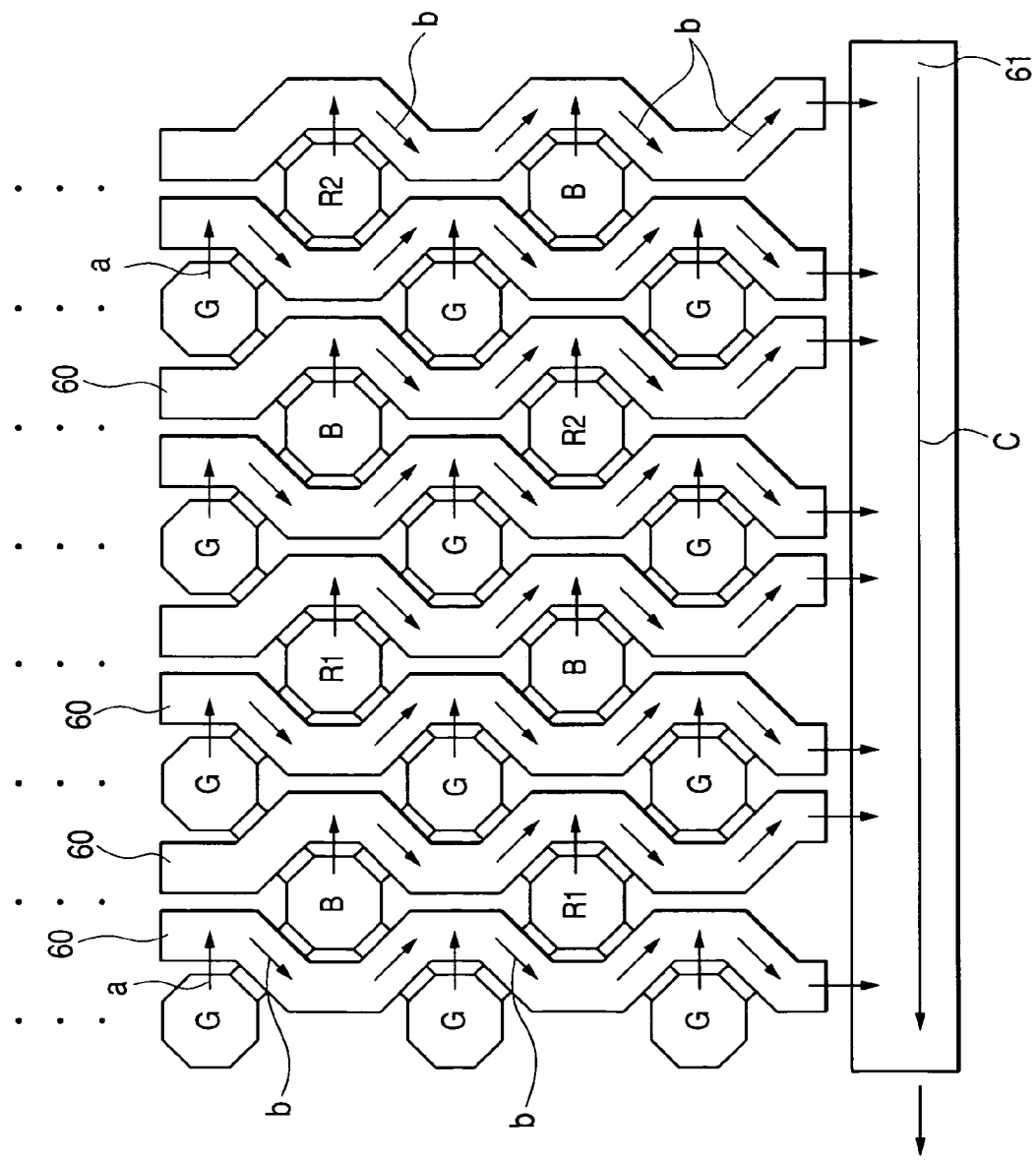

STATES OF COLORS ACHIEVED UNDER MIXED ILLUMINATION OF DAY LIGHT COLOR FLUORESCENT LAMP/A LIGHT SOURCE BEFORE CORRECTION (WB IS BASED ON A LIGHT SOURCE)

STATES OF COLORS ACHIEVED UNDER MIXED ILLUMINATION OF DAY LIGHT COLOR FLUORESCENT LAMP/A LIGHT SOURCE AFTER CORRECTION

STATES OF COLORS ACHIEVED UNDER MIXED ILLUMINATION OF F10/A LIGHT SOURCE BEFORE CORRECTION (WB IS BASED ON A LIGHT SOURCE)

STATES OF COLORS ACHIEVED UNDER MIXED ILLUMINATION OF F10/A LIGHT SOURCE AFTER CORRECTION

STATES OF COLORS ACHIEVED UNDER MIXED ILLUMINATION OF F12/A LIGHT SOURCE BEFORE CORRECTION (WB IS BASED ON A LIGHT SOURCE)

STATES OF COLORS ACHIEVED UNDER MIXED ILLUMINATION OF F12/A LIGHT SOURCE AFTER CORRECTION

SOLID-STATE IMAGING APPARATUS AND DIGITAL CAMERA FOR WHITE BALANCE CORRECTION

This Nonprovisional application claims priority under 35 U.S.C. § 119(a) on Patent Application No(s). 2003-117136 filed in JAPAN on Apr. 22, 2003, the entire contents of which are hereby incorporated by reference.

BACKGROUND OF THE INVENTION

1. Field of the Invention

The present invention relates to a solid-state imaging apparatus and a digital camera, and more particularly, to a solid-state imaging apparatus and a digital camera which achieve superior white balance when imaging a subject under a plurality of types of light sources, to thus produce an image with little color fogging.

2. Description of the Related Art

In a digital camera, such as a digital still camera (including one embedded in a portable cellular phone) or a digital video camera, a solid-state imaging device, such as a CCD or a CMOS image sensor, images a subject, corrects white balance of the thus-obtained image data in accordance with the type of illumination light radiated on the subject, and outputs the corrected white balance.

Previously-expected light sources include various typical light sources such as sun light (a D65 light source, a D75 light source or the like), a normal type white fluorescent lamp (an F6 light source), a three-band fluorescent lamp (including an F10 light source, an F11 light source, an F12 light source, or the like), and flash light. When automatically performing correction of white balance, the digital camera analyzes imaged image data and determines the type of the light source, to thus use correction values conforming to the type of the light source.

However, when photographing is performed, there may be a case where a subject is illuminated by only one type of light source and a case where there is photographed a scene of a subject being illuminated by a plurality of types of light sources. For instance, there is a case where an indoor scene is photographed with sunlight streaming through panes and in the interior of a room illuminated by a fluorescent lamp.

When image data—which have been imaged by means of photographing a subject illuminated by a plurality of types of light sources—are subjected to white balance correction, only one principal type of light source has hitherto been determined, and the entire image is corrected on the basis of the type of that light source. A remaining portion of the image outside the principal subject; that is, a portion of the image chiefly illuminated by other types of light sources, is susceptible to color fogging, to thus assume a strong yellowish or greenish tinge. This raises a problem of deterioration of color reproducibility (particularly reproducibility of gray or flesh color).

To solve the problem, the related-art technique described in, e.g., paragraph number [0026] of JP-A-8-340542 (corresponding to U.S. Pat. No. 5,808,681), proposes the following processing. Specifically, when a principal subject is photographed with a flash within a room illuminated by an F6 light source, the amount of influence of flash light is determined for each image area of a photographed image from image data obtained by a solid-state imaging device before emission of the flash and image data obtained by the solid-state imaging device after emission of the flash. In accordance with the amount of influence, the amount of correction on white balance is determined on a per-image-region basis, thereby generating an image having a superior white balance over the entirety thereof.

However, the related-art technique of JP-A-8-340542 is directed solely toward the case of emission of flash light and is configured such that two image data sets; that is, image data obtained before emission of a flash and image data obtained after emission of the flash, must be used.

For this reason, the technique described in JP-A-8-340542 cannot be applied to correction of white balance achieved when a subject under a plurality of types of light sources other than flash light has been photographed. The reason for this is that, when an indoor scene with sunlight streaming in through panes of a room illuminated with fluorescent lamps is photographed, only a single image data is obtained and image data to be obtained before being irradiated with sunlight or fluorescent lamps cannot be acquired.

SUMMARY OF THE INVENTION

An object of the present invention is to provide a solid-state imaging apparatus and a digital camera, which make superior corrections on white balance of an image when the image has been photographed under a mixture of illumination originating from a fluorescent lamp and illumination originating from other light sources, thereby diminishing the extent of color fogging and achieving high color reproducibility.

To achieve the object, the present invention is directed toward a solid-state imaging apparatus comprising: a solid-state imaging device having a plurality of pixels that image light originating from a subject, by dividing the light into a plurality of color signals; and a signal processor that subjects photographed image data output from the solid-state imaging device to white balance correction at a gain corresponding to light source type(s), wherein the solid-state imaging device further comprises a sensor that detects light in a wavelength range which induces a difference having a predetermined value or more between radiant energy of a first light source and radiant energy of a second light source, the sensor being provided on the surface of the solid-state imaging device; and wherein the signal processor further comprises: a mixing ratio estimation unit that determines a mixing ratio between illumination light originating from the first light source and illumination light originating from the second light source, through use of a detection signal output from the sensor; and a gain computation unit that computes a gain where the white balance correction is to be effected, in accordance with the mixing ratio.

The present invention is also directed toward a solid-state imaging apparatus comprising: a solid-state imaging device having a plurality of pixels that image light originating from a subject, by dividing the light into a plurality of color signals; and signal processing means for subjecting photographed image data output from the solid-state imaging device to white balance correction at a gain corresponding to light source type(s), wherein the solid-state imaging device further comprises a sensor for detecting light in a wavelength range which induces a difference having a predetermined value or more between radiant energy of a first light source and radiant energy of a second light source, the sensor being provided on the surface of the solid-state imaging device; and wherein the signal processing means further comprise: mixing ratio estimation means for determining a mixing ratio between illumination light originating from the first light source and illumination light originating from the second light source, through use of a detection signal output from the sensor; and gain computation means for computing a gain where the white balance correction is to be effected, in accordance with the mixing ratio.

By means of those configurations, even when a subject is illuminated by light sources of a plurality of types, color fogging is suppressed, and image data having superior color reproducibility can be obtained.

According to the present invention, there is provided the solid-state imaging apparatus, wherein the mixing ratio and the gain are determined with respect to each of the pixels.

By means of this configuration, color reproducibility is improved on a per-pixel basis.

According to the present invention, there is provided the solid-state imaging apparatus, wherein the signal processor comprises: a color tone correction unit for correcting a color tone by multiplying color difference signals determined from the photographed image data by a color difference matrix; and a color difference matrix correction unit for correcting coefficients of the color difference matrix in accordance with the mixing ratio.

By means of this configuration, white balance correction and color difference matrix correction according to the types of light sources and a mixing ratio therebetween can be effected automatically.

According to the present invention, there is provided the solid-state imaging apparatus, wherein the signal processor comprises a light source type determination unit that determines the type of a light source from the photographed image data. By means of this configuration, white balance correction and color difference matrix correction in accordance with the types of light sources and a mixing ratio therebetween can be automatically effected.

According to the present invention, there is provided the solid-state imaging apparatus, wherein the sensor acts also as the pixel that images the color signal.

By means of this configuration, deficiency of pixels at positions where the sensors are to be placed is prevented, and generation of photographed image data having a superior signal-to-noise ratio becomes possible.

The present invention is also directed toward a digital camera comprising: a solid-state imaging device having a plurality of pixels for imaging light originating from a subject, by dividing the light into a plurality of color signals; and a signal processor that subjects photographed image data output from the solid-state imaging device to white balance correction at a gain corresponding to light source type(s), wherein the solid-state imaging device further comprises a sensor that detects light in a wavelength range which induces a difference having a predetermined value or more between radiant energy of a first light source and radiant energy of a second light source, the sensor being provided on the surface of the solid-state imaging device; and wherein the signal processor further comprises: a mixing ratio estimation unit that determines a mixing ratio between illumination light originating from the first light source and illumination light originating from the second light source, through use of a detection signal output from the sensor; and a gain computation unit that computes a gain where the white balance correction is to be effected, in accordance with the mixing ratio.

The present invention is also directed toward a digital camera comprising: a solid-state imaging device having a plurality of pixels for imaging light originating from a subject, by dividing the light into a plurality of color signals; and signal processing means for subjecting photographed image data output from the solid-state imaging device to white balance correction at a gain corresponding to light source type(s), wherein the solid-state imaging device further comprises a sensor for detecting light in a wavelength range which induces a difference having a predetermined value or more between radiant energy of a first light source and radiant energy of a second light source, the sensor being provided on the surface of the solid-state imaging device; and wherein the signal processing means further comprise: mixing ratio estimation means for determining a mixing ratio between illumination light originating from the first light source and illumination light originating from the second light source, through use of a detection signal output from the sensor; and gain computation means for computing a gain where the white balance correction is to be effected, in accordance with the mixing ratio.

By means of those configurations, even when a subject is illuminated by a plurality of types, color fogging is suppressed, whereby image data having superior color reproducibility can be obtained.

The present invention is also directed toward a digital camera comprising the previously-described solid-state imaging apparatus. Even when a subject is illuminated by a plurality of types, color fogging is suppressed by this configuration, as well, whereby image data having superior color reproducibility can be obtained.

BRIEF DESCRIPTION OF THE DRAWINGS

FIG. 9 is a schematic surface view of a solid-state imaging device according to a second embodiment of the invention;

DETAILED DESCRIPTION OF THE INVENTION

Embodiments of the present invention will be described hereinbelow by reference to the drawings.

First Embodiment

Figure 1:
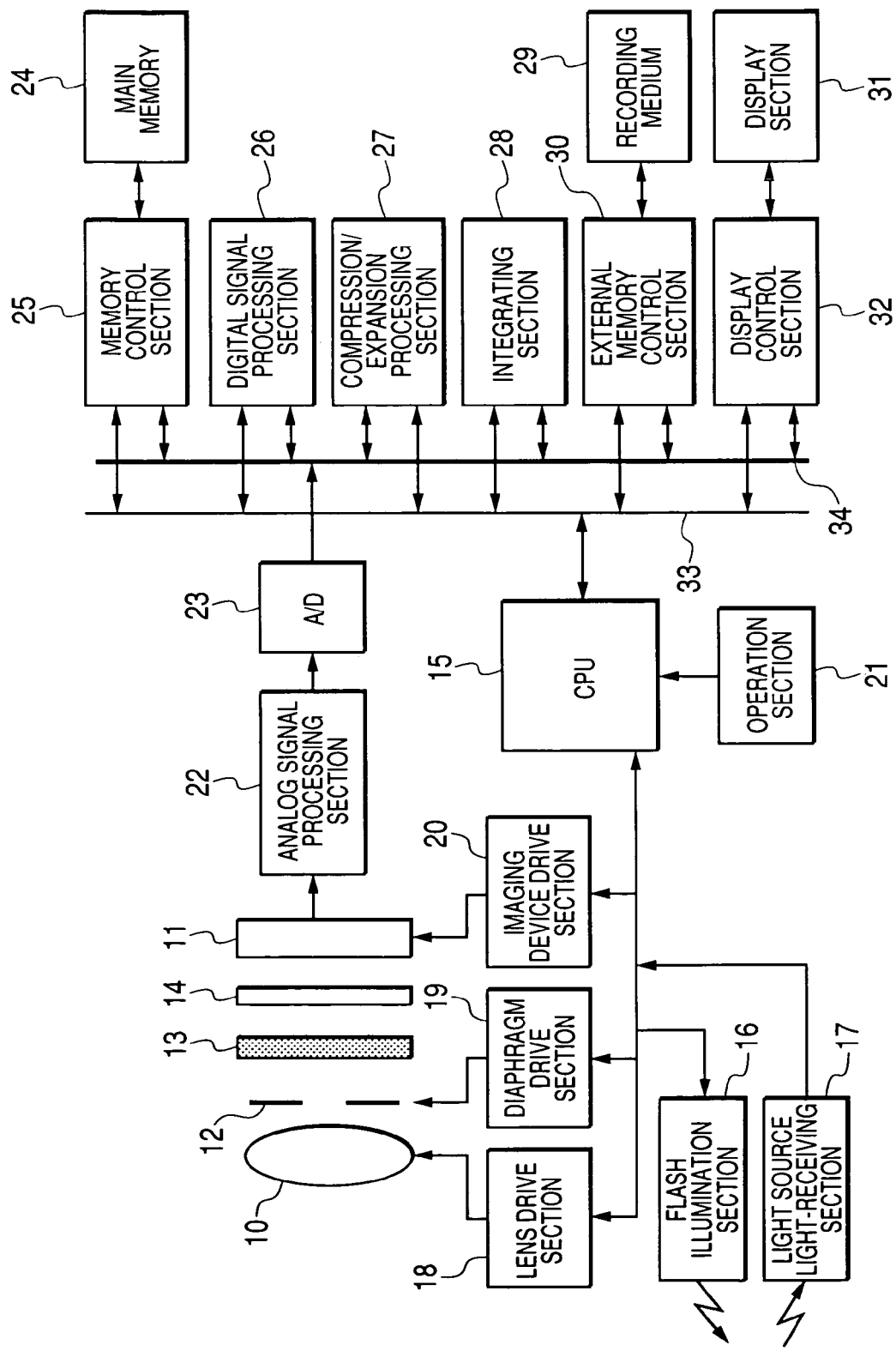
FIG. 1 is a block diagram of a digital still camera according to a first embodiment of the present invention.

FIG. 1 is a block diagram of a digital still camera according to a first embodiment of the present invention. The digital still camera comprises an imaging lens 10; a solid-state imaging device 11; a diaphragm 12 interposed between the imaging lens 10 and the solid-state imaging device 11; an infrared-ray block filter 13; and an optical low-pass filter 14. A CPU 15—which controls the entirety of the digital still camera—controls a flash illumination section 16 and a light-receiving section 17. Moreover, the CPU 15 adjusts the position of the imaging lens 10 to a focusing position by means of controlling a lens drive section 18 and controls the aperture size of the diaphragm 12 by way of a diaphragm drive section 19, to thus adjust the amount of light exposure to an optimum exposure level.

The CPU 15 drives the solid-state imaging device 11 by way of an imaging device drive section 20 and outputs a subject image photographed through the imaging lens 10 as a color signal. A user command signal is input to the CPU 15 by way of an operation section 21, and the CPU 15 performs various control operations in accordance with this command. Although the solid-state imaging device 11 may be embodied as any of a CCD of a honeycomb pixel layout, a Bayer CCD, or a CMOS sensor, in the present embodiment a CCD of honeycomb pixel layout (see FIG. 3) is used for the solid-state imaging device 11.

An electrical control system of the digital still camera comprises an analog signal processing section 22 connected to an output terminal of the solid-state imaging device 11; and an analog-to-digital conversion circuit 23 for converting a color signal output from the analog signal processing section 22 into a digital signal. They are controlled by the CPU 15.

Moreover, the electrical control system of the digital still camera further comprises a memory control section 25 connected to main memory 24; a digital signal processing section 26 to be described in detail later; a compression/expansion processing section 27 for compressing a imaged image into a JPEG file or expanding a compressed image; an integrating section 28 which integrates the image data—that have been output from the solid-state imaging device 11 and converted into digital data—on a per-color-signal basis and outputs resultant integrated values to the digital signal processing section 26; an external memory control section 30 to which a removable recording medium 29 is connected; and a display control section 32 to which a liquid-crystal display section 31 mounted on the back of a camera or the like is connected. The foregoing elements are mutually connected together by means of a control bus 33 and a data bus 34 and controlled in accordance with a command from the CPU 15.

The digital signal processing section 26, the analog signal processing section 22, the analog-to-digital conversion circuit 23, or the like, all being shown in FIG. 1, can also be incorporated as separate circuits into the digital still camera. However, these elements are preferably manufactured on a single semiconductor substrate along with the solid-state imaging device 11 in the form of a single solid-state imaging apparatus, through use of the LSI manufacturing technique.

Figure 2:
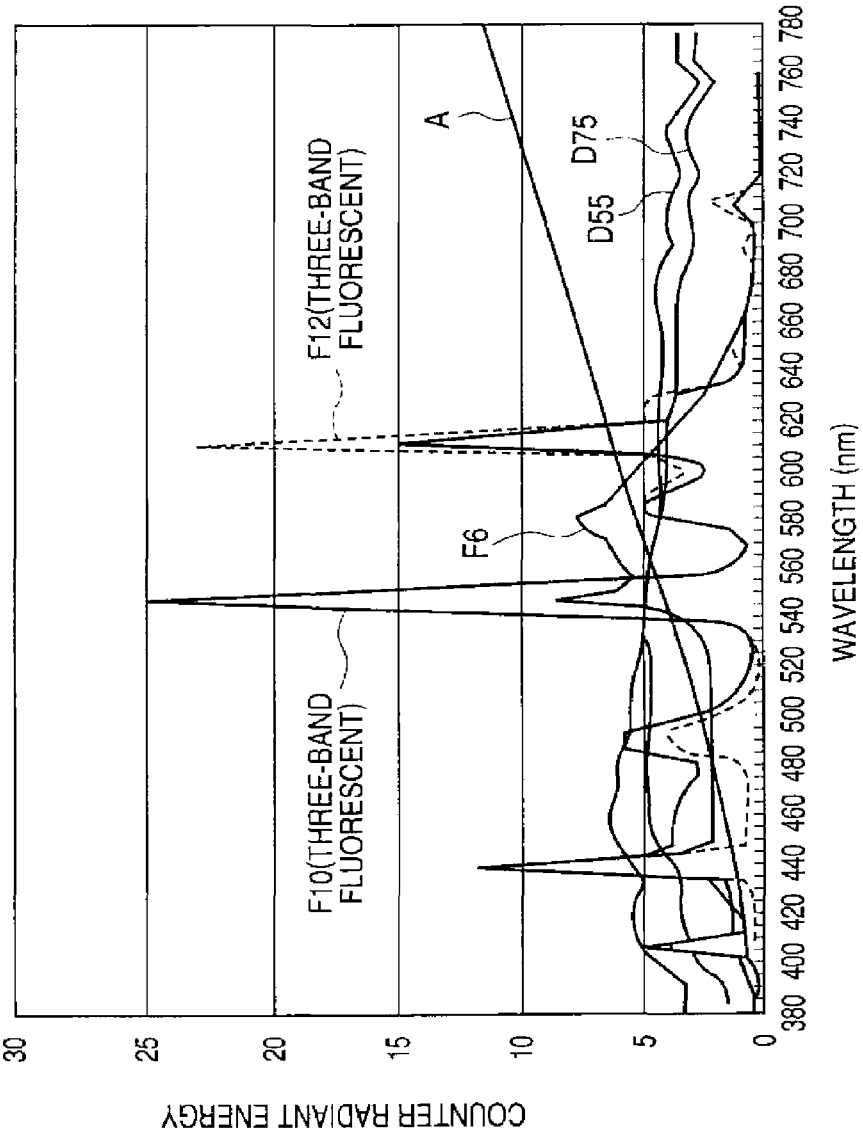
FIG. 2 is a graph showing distributions of spectral emission of respective types of imaging light sources.

FIG. 2 is a graph for comparing with each other relative radiant energy distributions of various types of light sources of identical illumination intensity. Illustrated light sources are six types; that is, D55 (sunlight); D75 (sunlight); A (tungsten light); F6 (normal type white fluorescent lamp); F10 (three-band fluorescent lamp); and F12 three-band fluorescent lamp).

From FIG. 2, it can comprehended that provision of a sensor that detects light of wavelengths provided below enables highly-accurate distinction of the three-band fluorescent lamp (F10 , F12, and etc.) from the other light sources (i.e., the sunlight, the A light source, and the F6 light source).

There is provided, e.g., a sensor that detects light having a wavelength of around 610 nm or a wavelength of around 545 nm, where a radiation peak of the three-band fluorescent lamp appears. In another example, there is provided a sensor that detects light having a wavelength of 640 nm or more where radiant energy of the fluorescent lamp is small or a sensor that detects light having a wavelength of around 570 nm to 580 nm where the three-band fluorescent lamp has low radiant energy and the common fluorescent lamp (F6) has high radiant energy. In addition, when the radiant distributions of the respective types of light sources are compared with each other at the same illumination intensity, any wavelength; e.g., a wavelength of 520 nm or thereabouts, is effective, so long as the light originating from the three-band fluorescent lamp differs from the light originating from the other light sources at that wavelength.

When two types of sensors are provided, the sensors preferably have detection wavelengths that are as close to each other as possible. Specifically, peak sensitivity wavelengths of the sensors preferably fall within 100 nm of each other. For example, there are provided a sensor that detects a wavelength of 545 nm and a sensor that detects a wavelength of 610 nm. Here, the term "peak sensitivity" means a peak in camera sensitivity. The reason for this is that, the closer the peak sensitivity wavelengths of the two types of sensors, the more accurately a light source mixing ratio can be estimated without dependence on the hue of a subject.

These sensors may be provided in the camera separately from the CCD or the CMOS or may be integrally incorporated into the camera along with a solid-state imaging device, such as a CCD or a CMOS.

Figure 3:
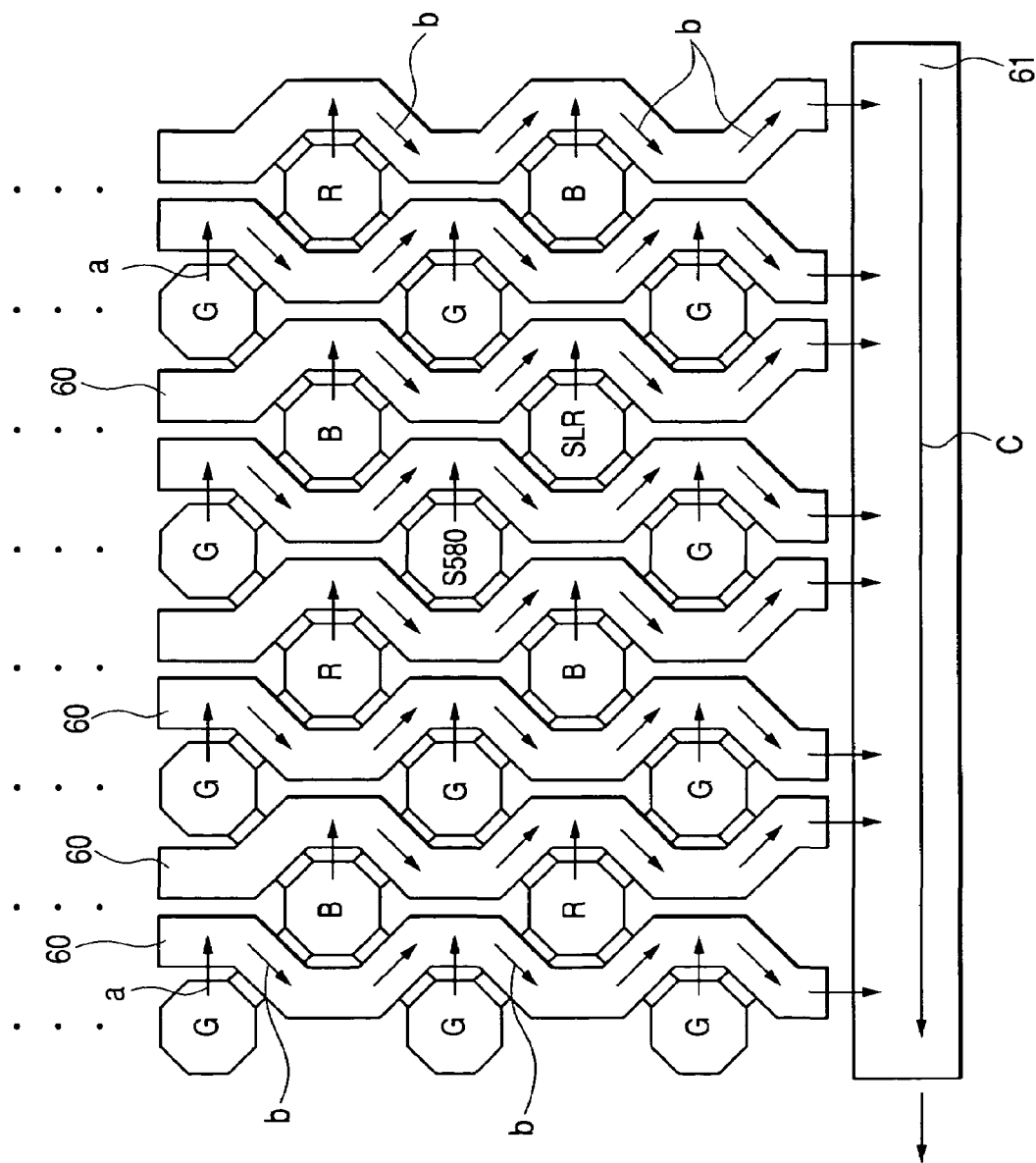
FIG. 3 is a schematic surface view of a solid-state imaging device shown in FIG. 1.

FIG. 3 is a schematic view showing a portion of the surface of the solid-state imaging device 11 shown in FIG. 1. This solid-state imaging device is of a so-called honeycomb pixel layout and has the following structure. Namely, a plurality of photodiodes having green filters are spaced apart from each other by a predetermined interval in rows and columns. Photodiodes having blue (B) and red (R) filters are alternately placed at positions which are offset by one-half pitch from the photodiodes of the respective rows and columns.

In the illustrated embodiment, octagonal frames labeled "R", "G", and "B" depict red (R), green (G), and blue (B) filters, respectively, and corresponding photodiodes are arranged below the filters (i.e., positions beneath the sheet of drawing paper) More accurately, octagonal frames depict shapes of the photodiodes, and the red, green, and blue filters are arranged in sizes (in e.g., octagonal or square shapes) which are larger than the octagonal frames.

Signal electric charges accumulated in the respective photodiodes as a result of light having entered the photodiodes through the color filters are read to vertical transfer channels 60 formed beside the respective photodiodes, in the direction of a narrow "a". As indicated by an arrow "b", the signal electric charges are transferred to the vertical transfer channels 60 and then to a horizontal transfer channel 61. The signal electric charges are then transferred along the horizontal transfer channel 61, as indicated by an arrow "c" and read by means of the solid-state imaging device. The amount of signal electric charges read from each pixel (i.e., each photodiode) assumes a value corresponding to the amount of light received by that photodiode.

The color filters are provided in a superimposed manner on the surface of each of the photodiodes of the solid-state imaging device 11, and these R, G, and B color filters are manufactured through use of, e.g., pigment or dye. In this embodiment, as shown in FIG. 3, a color filter (S580) which permits transmission of light in the vicinity of a wavelength of 580 nm is provided in place of, e.g., a G color filter, during manufacture in the proportion of one color filter to about 1000 pixels such that the color filters are dispersed uniformly over the surface of the solid-state imaging device 11. A color filter (SLR) which permits transmission of light having a wavelength of 640 nm or more is provided in place of, e.g., an R color filter. The color filter S580 and the SLR are preferably provided in an adjacent pair.

The electric charges accumulated in the pixel S580 and those accumulated in the pixel SLR are also read when the signal electric charges are read from the pixels G and R and used at the time of determination of the type of the light source or the mixing ratio. R, G, and B signal components accumulated in the pixels S580 and those accumulated in the SLRs are determined by means of interpolating the signal electric charges of the surrounding R, G, and B pixels.

Figure 4:
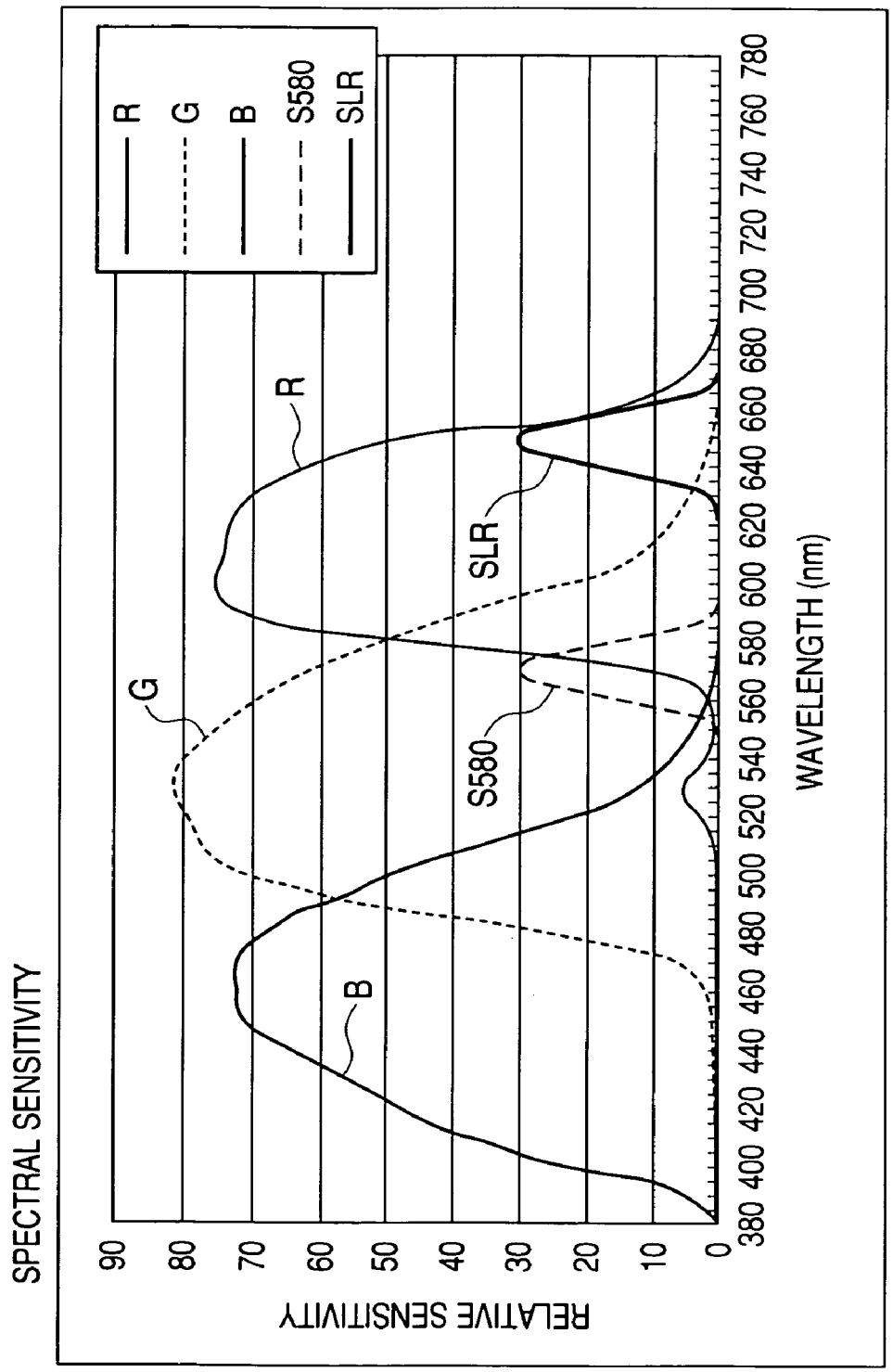
FIG. 4 is a graph showing spectral sensitivities of the digital still camera shown in FIG. 1.

FIG. 4 is a graph showing spectral sensitivities of a digital still camera (after having been combined with the infrared-ray block filter 13, the camera lens 10, or the like) equipped with the solid-state imaging device 11 having the foregoing color filters (R, G, B, S580, and SLR).

The respective color filters R, G, and B permit transmission of the light having wavelengths corresponding to red, green, and blue colors and block light having other wavelengths. For instance, the blue filter B is manufactured so as to have a peak of transmitted light in the vicinity of a wavelength of about 460 nm and to block light having a wavelength of about 400 nm or less and light having a wavelength of about 510 nm or more.

The green filter G has a waveform which blocks light having a wavelength of about 480 nm or less and light having a wavelength of about 600 nm or more and permits transmission of light having any wavelength falling within a range between the two wavelengths The red filter R blocks light having a wavelength of 580 nm or less and permits transmission of light having a wavelength of 580 nm or more. Light having a wavelength of 660 nm or more is blocked by the infrared-ray block filter 13.

Descriptions concerning spectral characteristics of the respective color filters R, G, and B that can be used in the embodiment are not strict. For instance, the expression "block light having a wavelength of 580 nm or less of R" may signify lax blockage of light ranging from, e.g., 550 nm to 610 nm, or may signify that leakage of light at a blue-light wavelength may also be acceptable. The same also applies to the G or B filters.

As shown in FIG. 2, the color filter S580 of the embodiment is manufactured so as to permit transmission of light at the wavelength ranging from 570 to 580 nm, at which the normal type fluorescent lamps (i.e., the F6 light source and etc.) has high radiation energy and the three-band fluorescent lamps have low radiation energy. The color filter SLR is manufactured to permit transmission of light at a wavelength of 640 nm or more, at which the fluorescent lamps (i.e., the F6 light source, the F10 light source, the F12 light source, and etc.) have low radiation energy.

Figure 5:
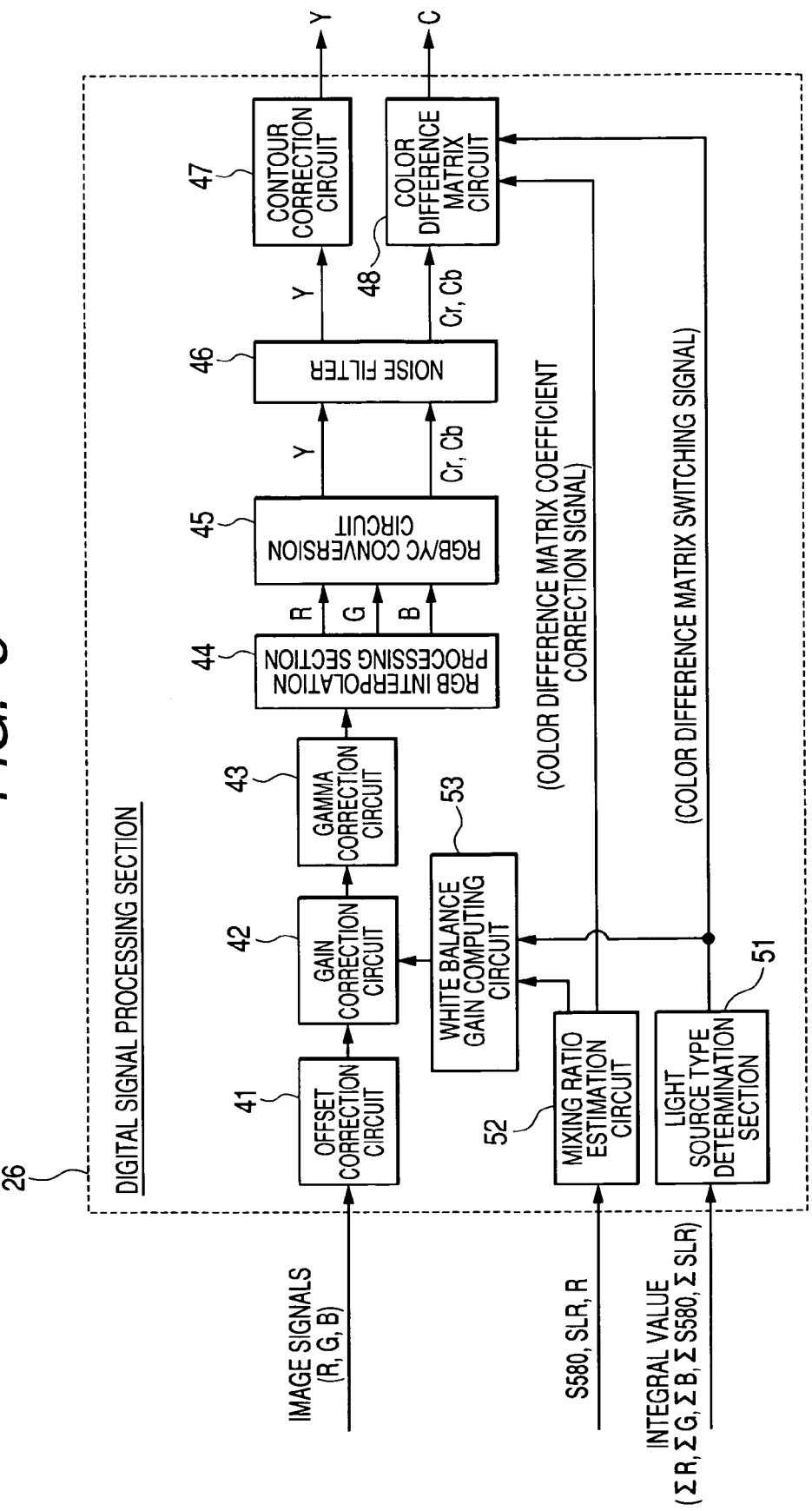
FIG. 5 is a detailed block diagram of a digital signal processing section shown in FIG. 1.

FIG. 5 is a detailed block diagram of the digital signal processing section 26 shown in FIG. 1. The digital signal processing section 26 may also be formed from a hardware circuit, or software which runs on a digital signal processor.

The digital signal processing section 26 of the illustrated embodiment comprises an offset correction circuit 41 which takes in image signals respective R, G, and B colors output from the analog-to-digital conversion circuit 23 and subjects the signals to offset processing; a gain correction circuit 42 which takes in a signal output from the offset correction circuit 41 and subjects the signal to white balance adjustment through use of gain values computed by a white balance gain computation circuit 53 to be described later; and a gamma correction circuit 43 for subjecting a signal output from the gain correction circuit 42 to gamma correction through use of a predetermined γ value.

The color signals output from the analog-to-digital conversion circuit 23 are image signals consisting of the three colors R, G, and B. The offset correction circuit 41 takes in the image signals and subjects the signals to offset processing. Next, the gain correction circuit 42 subjects the thus-acquired image signals R, G, and B to white balance correction processing, respectively.

The digital signal processing section 26 further comprises an RGB interpolation processing section 44 which subjects the R, G, and B image signals output from the gamma correction circuit 43 to interpolation processing, to thus determine three color signal components, i.e., R, G, and B signal components accumulated in the positions of the respective pixels; an RGB/YC conversion circuit 45 for determining a luminance signal Y and color difference signals Cr, Cb from the RGB signals after the same have been subjected to RGB interpolation processing; a noise filter 46 for reducing noise from the luminance signal Y and the color difference signals Cr, Cb; a contour correction circuit 47 for subjecting to contour correction the luminance signal Y whose noise has been reduced; and a color difference matrix circuit 48 for subjecting the color difference signals Cr, Cb whose noise has been reduced to color tone correction by means of multiplying the color difference signals by a color difference matrix (C-MTX).

Moreover, the digital signal processing section 26 comprises a light source type determination section 51 which acquires integral values $\Sigma R$, $\Sigma G$, $\Sigma B$, $\Sigma S580$, and $\Sigma SLR$ of the signals R, G, B, S580, and SLR output from the integral section 28, to thus determine the type of a light source; a light source mixing ratio estimation circuit 52 which estimates a light source mixing ratio by means of acquiring detection signals pertaining to the pixel S580 and SLR and the red signal R, to thus estimate a light source mixing ratio; and the white balance gain computing circuit 53.

The white balance computing circuit 53 receives a signal output from the light source type determination circuit 51 and a signal output from the light source mixing ratio estimation circuit 52. When the light source illuminating the subject is of only one type, a white balance gain corresponding to the type of the light source is output to the gain correction circuit 42. When the light source illuminating the subject is a mixture of a specific light source and another light source, a white balance gain corresponding to a mixing ratio between the types of light sources is computed, and the result of computation is output to the gain correction circuit 42.

The color difference matrix circuit 48 is provided with a plurality of types of color difference matrices corresponding to light sources. A color difference matrix to be used is switched in accordance with the type of the light source determined by the light source type determination circuit 51. The input color difference signals Cr, Cb are multiplied by the color difference matrix [C-MTX] obtained after switching, in the manner as represented by expression provided below, to thus output color difference signals Cr', Cb' that have been subjected to color tone correction.

$$\text{Provided that}[C-MTX] = \begin{bmatrix} a, & b \\ c, & d \end{bmatrix},$$

$$\begin{bmatrix} Cr' \\ Cb' \end{bmatrix} = [C-MTX] \times \begin{bmatrix} Cr \\ Cb \end{bmatrix},$$

where Cr, Cr', Cb, Cb' assume values in the range from −128 to +127 (in the case of 8 bits).

This color difference matrix circuit 48 receives a signal output from the light source type determination circuit 51 and a signal output from the light source mixing ratio estimation circuit 52. When there are a plurality of types of light sources, coefficients of the color difference matrix are corrected as follows in accordance with the mixing ratio of illumination light for each type of light source.

A coefficient of the color matrix [C1-MTX] employed when the illumination light originating from a light source L1 assumes a value of 100% and a coefficient of a color matrix [C2-MTX] employed when the illumination light originating from a light source L2 assumes a value of 100% are expressed by the following Expression:

$$[C_1 - MTX] = \begin{bmatrix} a_1 & b_1 \\ c_1 & d_1 \end{bmatrix}$$

$$[C_2 - MTX] = \begin{bmatrix} a_2 & b_2 \\ c_2 & d_2 \end{bmatrix}$$

When the mixing ratio of the light source L1 to the light source L2 is m:(1−m), coefficients "a", "b", "c", and "d" of the color difference matrix used by the color difference matrix circuit 48 are determined as follows:

$$a = m \times a1 + (1-m) \times a2$$

$$b = m \times b1 + (1-m) \times b2$$

$$c = m \times c1 + (1-m) \times c2$$

$$d = m \times d1 + (1-m) \times d2$$

Alternatively, the color matrix can be consecutively changed from C1-MTX to C2-MTX dependent on "m" by means of arbitrary equations or a lookup table other than the expressions set forth.

The optimum color difference matrices corresponding to the light sources L1, L2 are determined preferably under the condition, in which the white balance correction is effected by means of the present invention. Particularly, the color difference matrices are preferably determined such that a superior color hue of flesh color is achieved and remains unchanged without regard to the type of the light source. Simultaneously, preferably color reproducibility of common colors is determined so as to become as close as possible to that achieved when an image has been photographed under a reference light source.

The integral section 28 divides one screen photographed by the solid-state imaging device 11 into regions of, for example, 8×8=64, integrates $\Sigma R$, $\Sigma G$, and $\Sigma B$ values of the signal electric charges accumulated in the respective sub-divisions, and output the results of integration. The light source type determination circuit 51 acquires the respective integral values $\Sigma R$, $\Sigma G$, and $\Sigma B$, to thus determine a set of data $\Sigma R/\Sigma G$ and another set of data $\Sigma B/\Sigma G$; plots 64 sets of data in a two-dimensional space defined by R/G axes and B/G axes; and detects the type of the imaging light source from the profile of a distribution pattern.

When the profile of the distribution pattern corresponds to both the profile of a distribution pattern of a certain type of a light source and a distribution pattern of another type of another light source, two types of light sources are determined to exist, and the types of the light sources are determined. When the user has entered the types of the light sources by way of the operation section 21 shown in FIG. 1, the entered types of the light sources are used.

Mixing ratio estimation processing to be performed by the light source mixing ratio estimation circuit 52 will be described. When the radiant energies of the light sources L1, L2 are compared with each other at the same illumination intensity, the radiant energy of the light source L1 is lower than that of the light source L2 in both a wavelength range from 570 nm to 580 nm and a wavelength range of 640 nm or more. Therefore, under the assumption that a detection signal output from the pixel S580 for sensor purpose is expressed as "S580", a detection signal output from the SLR is expressed as "SLR", and the output value from the pixel R is expressed as "R", a value of a ratio X provided below is computed.

$$X = (S580 + k \times SLR)/R$$

The value X of the ratio monotonously increases from a ratio of 100% of the light source L1 to a ratio of 100% of the light source L2 regardless of the color of the subject, provided that the light source L1 is the three-band fluorescent lamp and the light source L2 is sunlight or the A light source. Further, the absolute value of the ratio X becomes considerably close to a given value without regard to the color (natural color) of the subject when the mixing ratio between the light sources L1 and L2 is constant. Namely, the mixing ratio between the light sources can be estimated with high accuracy, so long as the subject assumes a natural color.

This phenomenon can be described as follows: As can be seen from FIG. 4, the spectral sensitivity of R includes the sensitivities corresponding to S580 and SLR. Therefore, the value X obtained by dividing (S580+k×SLR)/R signifies a sum of a ratio A of incident light at 580 nm or thereabouts and a ratio B of incident light at 640 nm or more in the red color wavelength range. The larger the ratio of light of the fluorescent lamps, the smaller the values of A and B, and the absolute values of them vary according to the color of the subject.

However, the spectral reflectivity characteristic of a natural color assumes any one of three patterns in a narrow wavelength band (a range of about 100 nm); that is, a substantial flat pattern, a substantially right-upward pattern, and a substantially right-downward pattern. Therefore, if A and B are added together and the resultant sum is divided by R, a result of division approximates a predetermined value regardless of the color.

In the present embodiment, the value of the mixing ratio "m" is computed through use of the value of the ratio X and according to the following Equation.

$$m = k_1 X^2 + k_2 X + k_3$$

Here, $k_1$, $k_2$, and $k_3$ are coefficients, and the coefficients $k_1$, $k_2$, and $k_3$ are determined by the expression defined by color temperatures of the light sources L1, L2. The expressions are stored in the camera in advance. Alternatively, previously-computed values are stored as table data.

A specific example will now be described. A subject is photographed under mixed light originating from a combination of the F12 light and sunlight D65. In this case, the following equations are computed:

$$m = -0.0794 X^2 + 0.786 X - 0.494$$

$$X = (S580 + 1.564 SLR)/R$$

where m=1 when m>1,
  m=0 when m<0, and
  m=0 when R=0.
Here, m=1 signifies 100% of D65.

In this case, the value of R, that of S580, and that of SLR are determined by multiplying the output value of the solid-state imaging device 11 by a white balance (WB) coefficient for D65 (the coefficient is set in the camera as a default value)

Figure 6A:
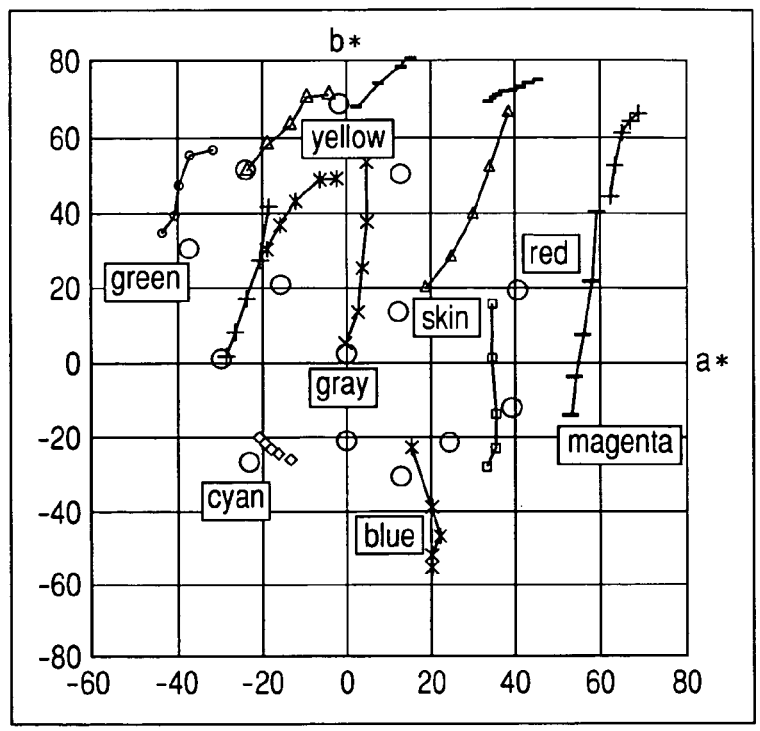
FIG. 6A is a view showing loci of colors reproduced when illumination light originating from a D65 light source is mixed with illumination light originating from an F12 light source.
Figure 6B:
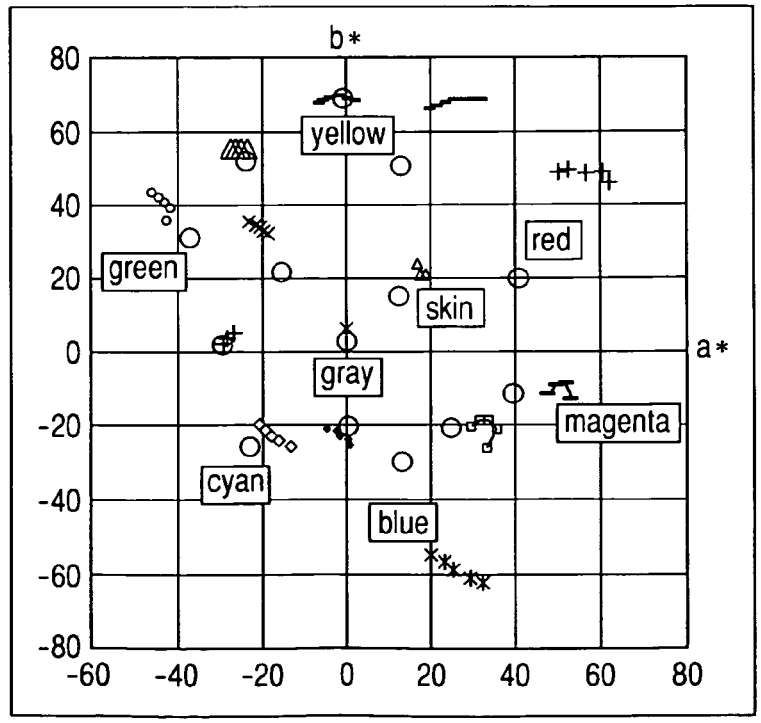
FIG. 6B is a view showing loci of colors reproduced after the colors have been subjected to correction through use of an estimated mixing ratio of the first embodiment.

FIGS. 6A and 6B are views showing correction effects achieved in the specific example. FIG. 6A shows the state of colors obtained before correction; and FIG. 6B shows the state of the colors obtained after white balance correction and color difference matrix correction. Circles provided in FIG. 6A show points where respective colors were measured under light D65. Lines extending from the neighborhood of the respective circles show loci of colors reproduced when the illumination light originating from the D65 light source is mixed with the illumination light originating from the F12 light source.

In FIG. 6A showing the colors achieved before correction, the loci of substantially all the reproduced colors extend in an upward direction along the vertical axis; that is, a direction b*. This direction shows the direction of yellow and indicates that, when the illumination light originating from the F12 light source is mixed with the sunlight (i.e., the D65 light source), all the colors become tinged with yellow.

In contrast, as shown in FIG. 6B, when the colors are subjected to white balance correction and color difference matrix correction through use of the estimated mixing ratio, tinging of the colors, particularly gray and flesh color, with yellow is understood to be inhibited even when the illumination light originating from the F12 light source is mixed with the sunlight (i.e., the D65 light source).

Although the correction effect stemming from use of such an estimated mixing ratio "m" is omitted from the drawings, the correction effect can also be yielded in the same manner by combination of the three-band fluorescent lamp (various light sources, such as the F12 light source, the F11 light source, the F10 light source, and the day light color light source), and sunlight (D75, D65, and D50) or flash light.

Figure 7A:
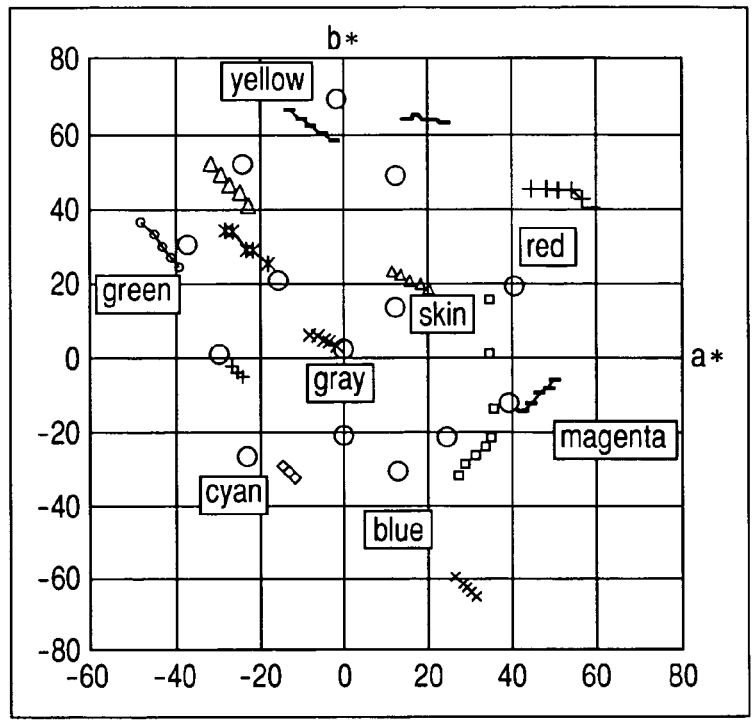
FIG. 7A is a view showing loci of colors reproduced when illumination light originating from an A light source is mixed with illumination light originating from the F12 light source.
Figure 7B:
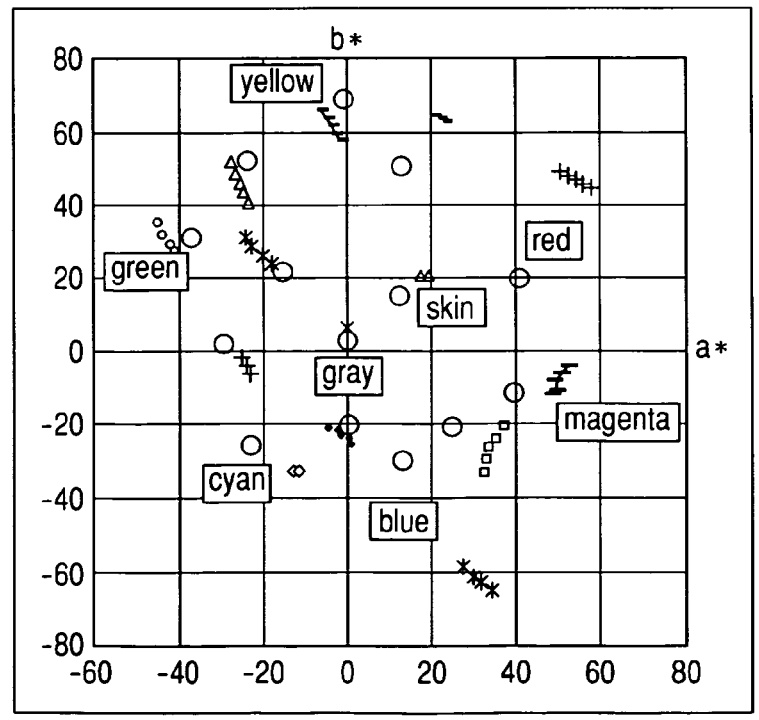
FIG. 7B is a view showing loci of colors reproduced after the colors have been subjected to correction through use of the estimated mixing ratio of the first embodiment.

FIGS. 7A and 7B are views showing a correction effect achieved when the F12 light source and the A light source are mixed together. FIG. 7A is a view showing the states of colors achieved before correction, and FIG. 7B is a view showing the states of colors achieved after correction. The estimated mixing ratio "m" is determined as:

$$m = 0.0383 X^2 + 0.356 X - 0.258 \text{ (m=1 signifies 100\% of A light source)}.$$

As in the case described above, X is determined while coefficient "k" is taken as 1.564.

Circles provided in FIG. 7A show points where respective colors were measured under the A light source. Lines extending from the neighborhood of the respective circles show loci of colors reproduced when the illumination light originating from the A light source is mixed with the illumination light originating from the F12 light source.

In FIG. 7A showing the state of the colors before correction, the loci of the substantial portions of the reproduced colors extend toward northwest and have become tinged with green. In contrast, as shown in FIG. 7B, when the colors have been subjected to white balance correction and color difference matrix correction through use of the estimated mixing ratio "m", tinging of the colors, particularly gray, with green is understood to be inhibited even when the illumination light originating form the F12 light source is mixed with the illumination light originating from the A light source.

Figure 8A:
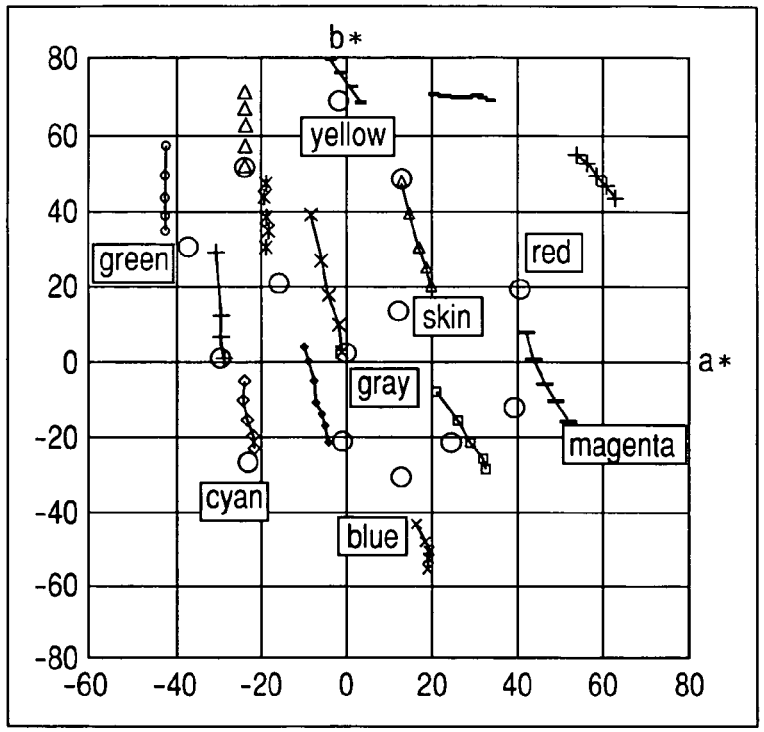
FIG. 8A is a view showing loci of colors reproduced when illumination light originating from the D65 light source is mixed with illumination light originating from an F6 light source.
Figure 8B:
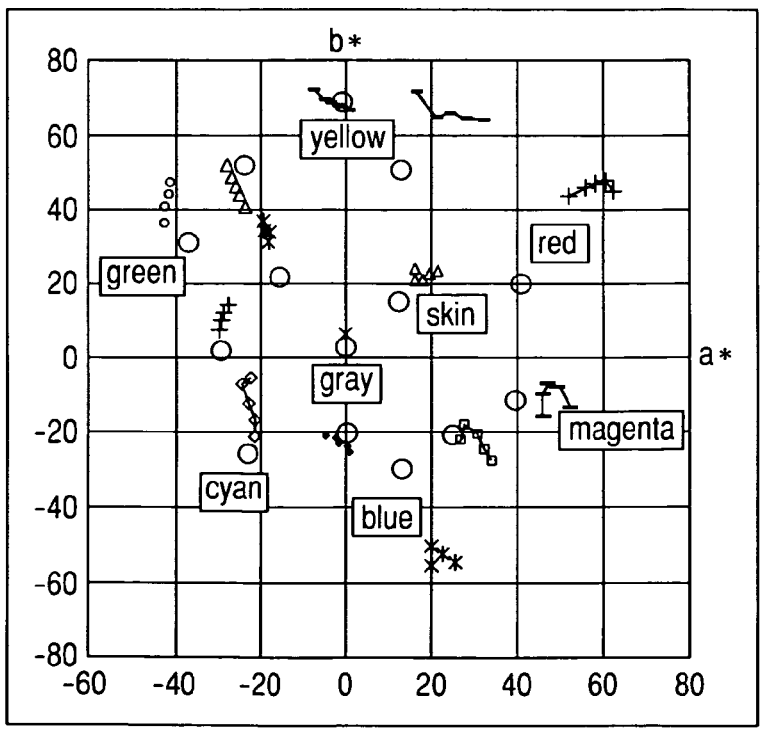
FIG. 8B is a view showing loci of colors reproduced after the colors have been subjected to correction through use of the estimated mixing ratio of the first embodiment.

FIGS. 8A and 8B are views showing correction effects achieved when the illumination light originating from the F6 light source and that originating from the D65 light source (i.e., sunlight) are mixed together. Here, the estimated mixing ratio "m" is determined by $$m = 0.177 X^2 + 1.115 X - 1.068$$

(m=1 signifies 100% of D65), and the value of ratio X is determined by $$X = (SLR + 0.499 G)/R$$

where m=1 when m>1,
  m=0 when m<0, and
  m=1 when R=0.

Circles shown in FIG. 8A show points where the respective colors were measured under the illumination light originating from the D65 light source. Lines extending from the neighborhood of the respective circles show loci of colors reproduced when the illumination light originating from the D65 light source is mixed with the illumination light originating from the F6 light source.

In FIG. 8A showing the state of the colors achieved before correction, the loci of substantially all the reproduced colors extend in the upward direction along the vertical axis; that is, the direction of b*, and all the colors are essentially tinged with yellow. In contrast, as shown in FIG. 8B, when the colors are subjected to white balance correction and color difference matrix correction through use of the estimated mixing ratio "m", tinging of essentially all the colors with yellow is understood to be inhibited even when the illumination light originating from the D65 light source is mixed with the illumination light originating from the F6 light source.

Second Embodiment

A digital still camera according to a second embodiment of the present invention will now be described. The digital still camera of the present embodiment is identical in configuration with that described in connection with the first embodiment shown in FIG. 1, and the digital signal processing section 26 is also analogous in configuration with the counterpart shown in FIG. 5.

In the first embodiment, the sensors S580 that detects light at a wavelength range of about 580 nm and the sensors SLR that detects light at a wavelength range of 640 nm or more are provided in the solid-state imaging device 11. However, pixels—which are originally to be disposed in the positions of these sensors—become deficient, and hence color signal components to be accumulated at the positions of the sensors must be determined by interpolation of the color signal components of the pixels disposed around the sensors.

In order to prevent deficiency of the pixels, the sold-state imaging device 11 to be incorporated into the digital still camera of the embodiment is arranged to be able to yield essentially the same effect as that yielded when the sensors are provided in the solid-state imaging device, by means of putting contrivance in the R, G, and B spectral sensitivities.

Figure 10:
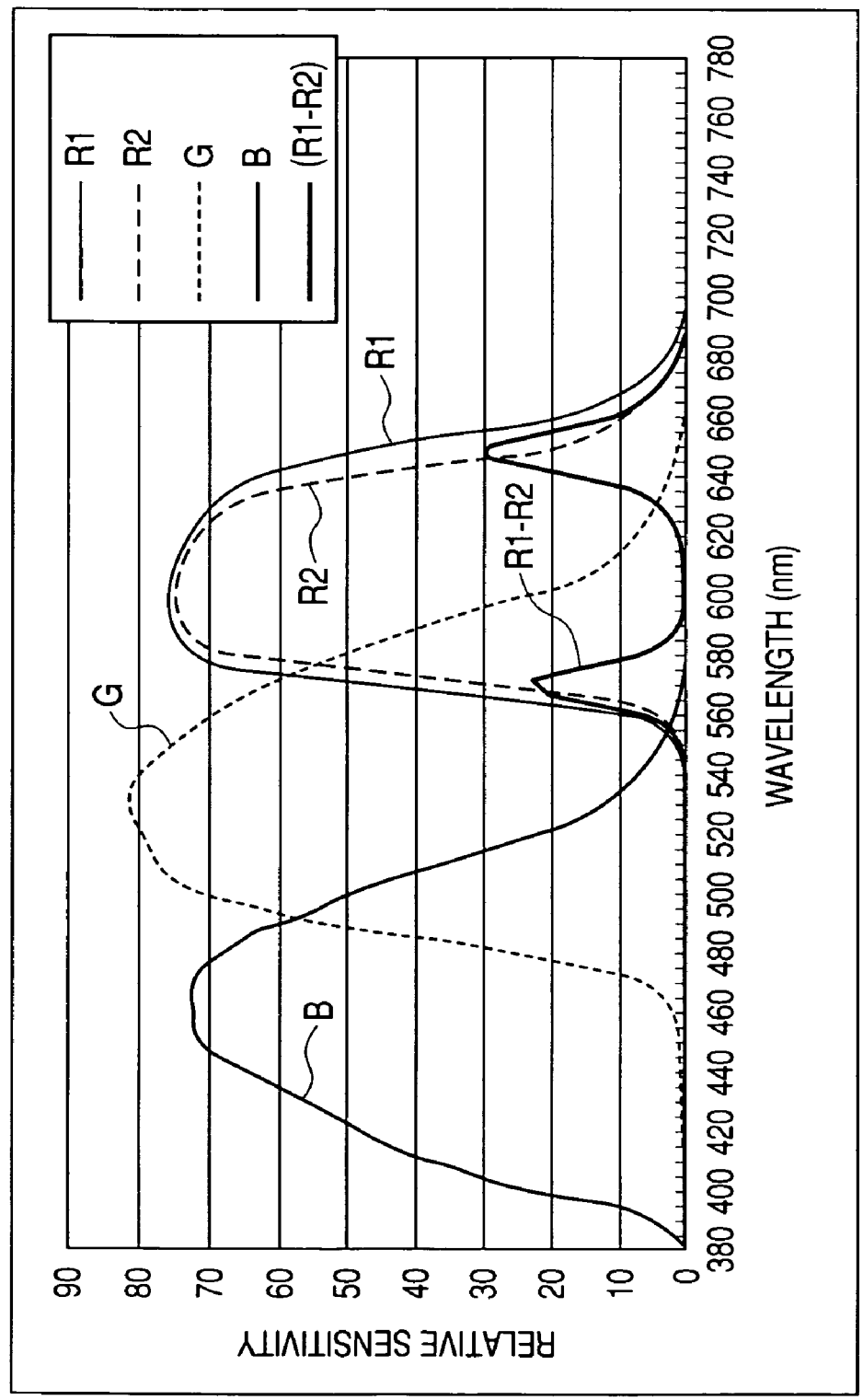
FIG. 10 is a graph showing spectral sensitivities of a digital still camera of the second embodiment of the invention.

FIG. 9 is a fragmentary schematic view showing the surface of the solid-state imaging device 11 of the present embodiment. In the embodiment, two types of spectral sensitivities R1, R2 are set as spectral sensitivities of the pixels for detecting red R. FIG. 10 is a graph showing a spectral sensitivity (spectral sensitivity of the camera) according to the embodiment. The spectral sensitivity R1 and the spectral sensitivity R2 are designed such that $$R1-R2=S580+SLR.$$

When viewed from another aspect, the spectral sensitivity R2 is designed such that a peak appears in the vicinity of a radiant peak of 610 nm of the three-band fluorescent lamp.

In the embodiment, R1, R2 are provided. However, G1, G2 or B1, B2 may also be provided, to thus enable detection of light at a wavelength of 520 nm or light in another wavelength.

In the present embodiment, the R1, R2, G, and B color signals are detected, and hence image data without deficiency of pixels can be produced through use of these color signals. Moreover, the sensor detection signals of the S580 and the SLR can also be obtained simultaneously. Various methods may be employed for determining an R color signal from the spectral sensitivities R1, R2, including simple summation and averaging of the R1 color signal and the R2 color signal.

There will now be described correction to be performed when the illumination light originating from the three-band fluorescent lamp and the sunlight [having color temperature ranging from 5000 K (D50) to 7500 K (D75)] are mixed together in the present embodiment.

In the embodiment, the mixing ratio "m" is determined by $$m=-28.84X^2+63.81X-33.97$$

($m=1$ signifies 100% of D65), and the relation $X=R1/R2$ is assumed where m=1 when m>1,
m=0 when m<0, and
m=0 when R2=0.

Figure 11A:
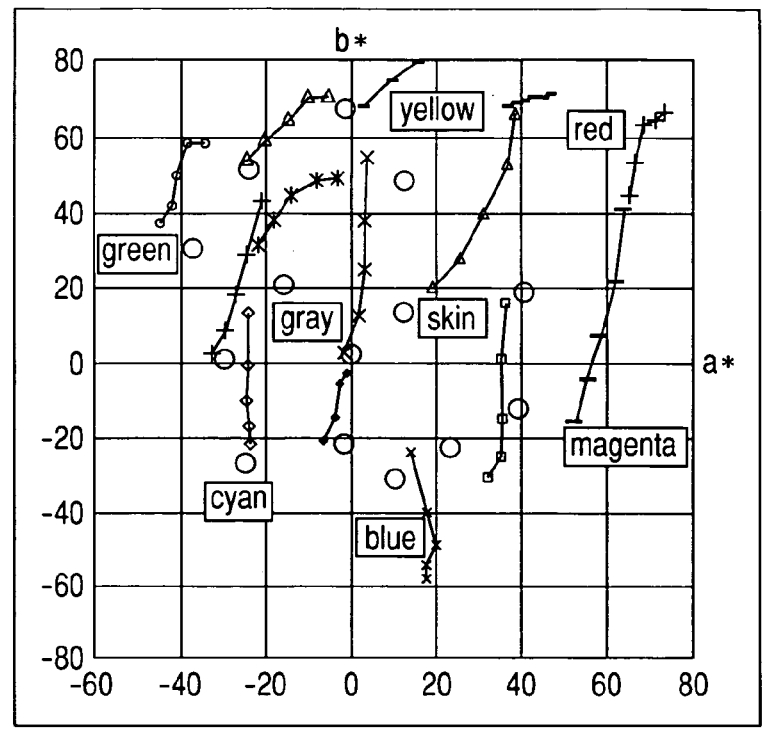
FIG. 11A is a view showing loci of colors reproduced when illumination light originating from a D65 light source is mixed with illumination light originating from an F12 light source.
Figure 11B:
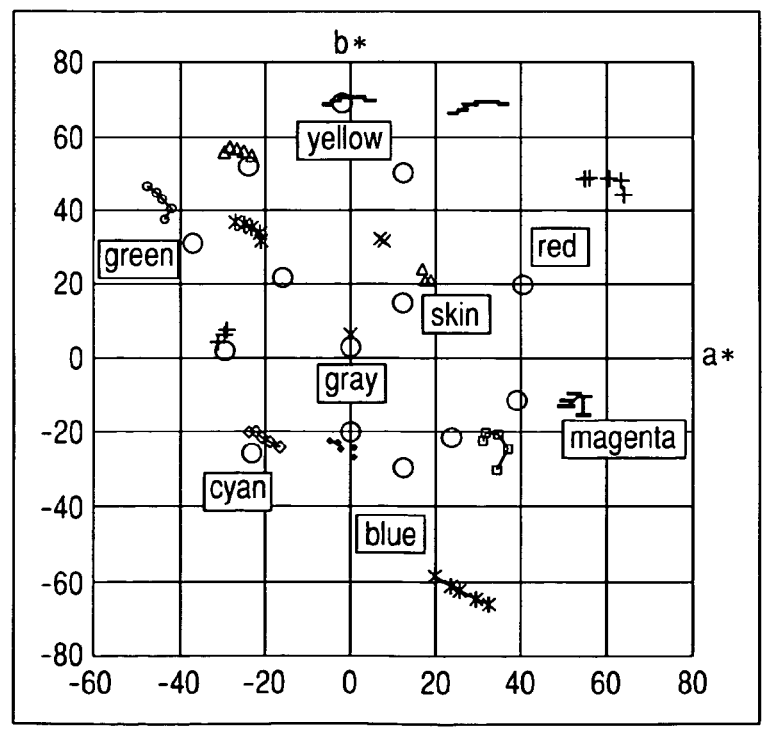
FIG. 11B is a view showing loci of colors reproduced after the colors have been subjected to correction through use of an estimated mixing ratio of the second embodiment.

FIGS. 11A and 11B are views showing a correction effect achieved when the illumination light originating from the F12 light source and that originating from the D65 light source (sunlight) are mixed together. Circles shown in FIG. 11A show points where the respective colors were measured under the illumination light originating from the D65 light source. Lines extending from the vicinities of the circles show loci of colors reproduced when the illumination light originating from the D65 light source is mixed with the illumination light originating from the F12 light source.

Figure 12A:
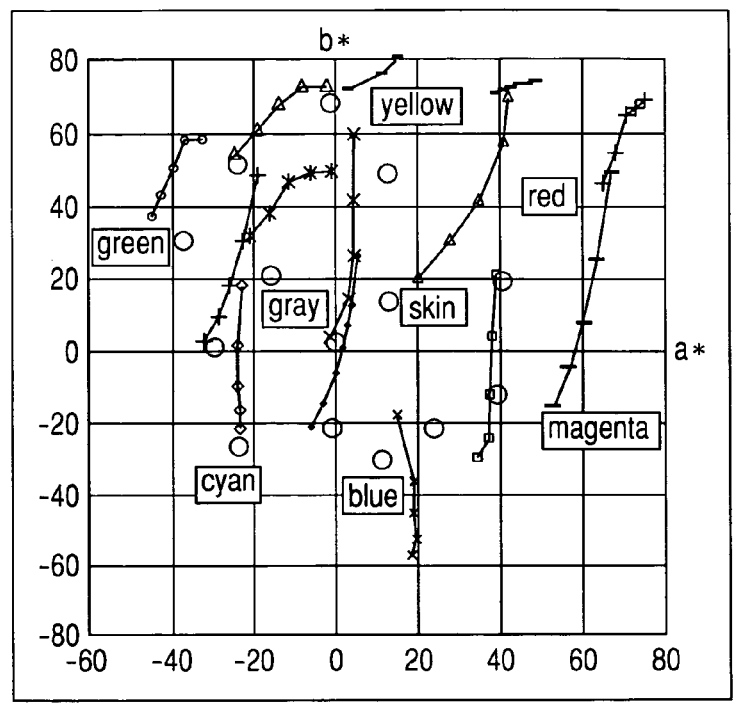
FIG. 12A is a view showing loci of colors reproduced when illumination light originating from a D75 light source is mixed with illumination light originating from the F12 light source.
Figure 12B:
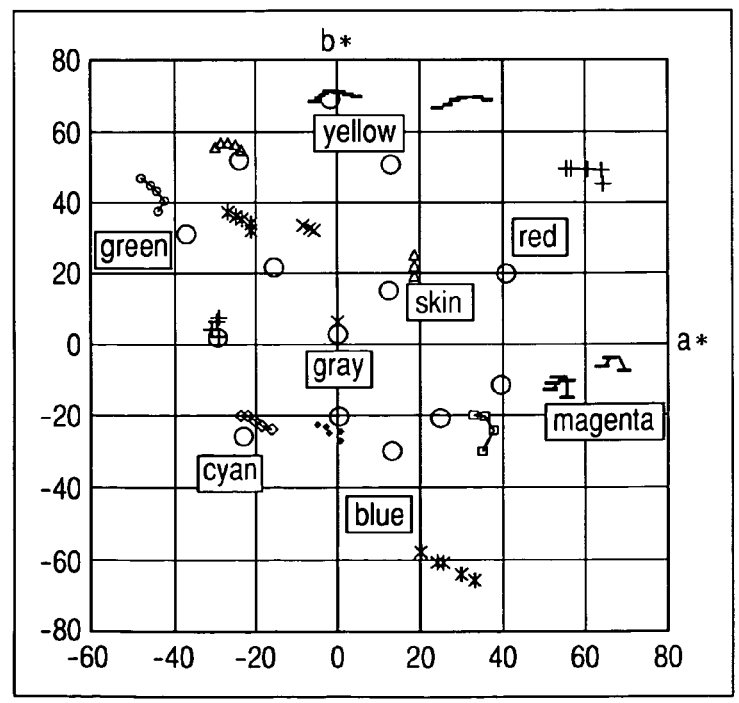
FIG. 12B is a view showing loci of colors reproduced after the colors have been subjected to correction through use of an estimated mixing ratio of the second embodiment.

FIGS. 12A and 12B are views showing a correction effect achieved when the illumination light originating from the F12 light source and that originating from the D75 light source (sunlight) are mixed together. Circles shown in FIG. 12A show points where the respective colors were measured under the illumination light originating from the D75 light source. Lines extending from the neighborhood of the circles show loci of colors reproduced when the illumination light originating from the D75 light source is mixed with the illumination light originating from the F12 light source.

Figure 13A:
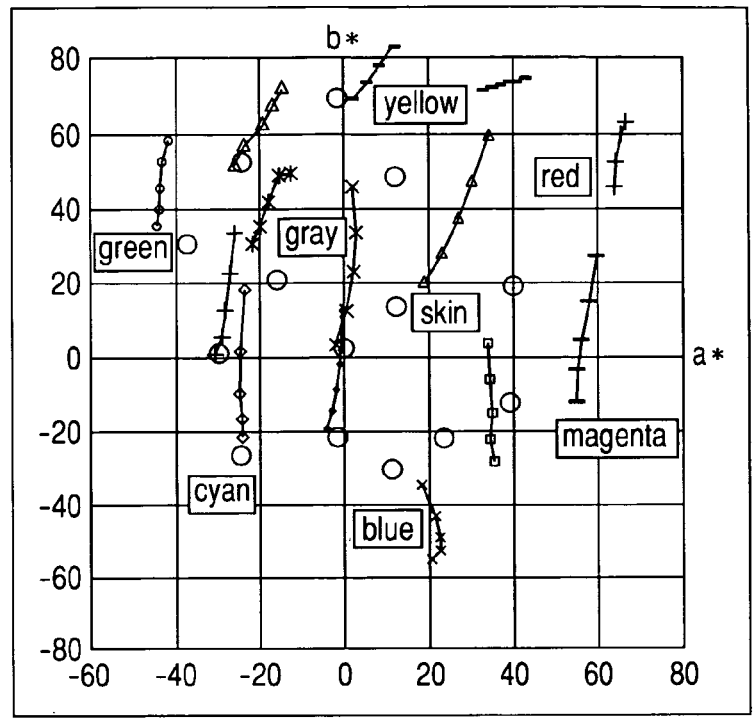
FIG. 13A is a view showing loci of colors reproduced when illumination light originating from a D50 light source is mixed with illumination light originating from the F12 light source.
Figure 13B:
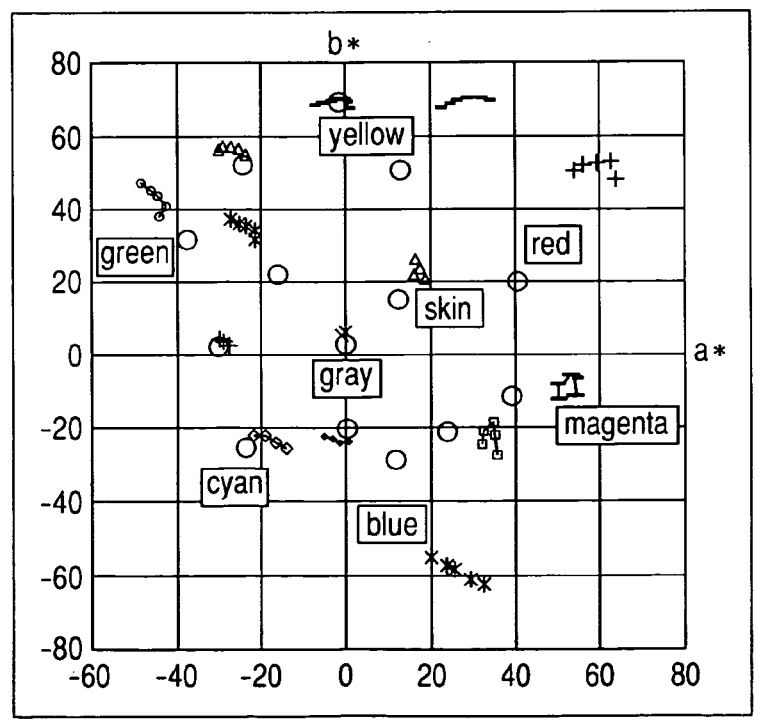
FIG. 13B is a view showing loci of colors reproduced after the colors have been subjected to correction through use of the estimated mixing ratio of the second embodiment.

FIGS. 13A and 13B are views showing a correction effect achieved when the illumination light originating from the F12 light source and that originating from the D50 light source (sunlight) are mixed together. Circles shown in FIG. 13A show points where the respective colors were measured under the illumination light originating from the D50 light source. Lines extending from the vicinities of the circles show loci of colors reproduced when the illumination light originating from the D50 light source is mixed with the illumination light originating from the F12 light source.

In any case, before correction, the loci of substantially all the reproduced colors extend upwardly along the vertical axis; that is, the direction of b*. As a result of the illumination light rays being mixed with the illumination light originating from the F12 light source, substantially all the colors have become tinged with yellow. As a result of the colors being subjected to white balance correction and color difference matrix correction through use of the estimated mixing ratio, tinging of substantially all the colors with yellow is understood to be inhibited.

The foregoing mixing ratio estimation equation is for highly accurately estimating a mixing ratio between the illumination light originating from the F12 light source and that originating from the D65 light source under the assumption that the subject assumes gray. In the case of a three-band fluorescent lamp other than the F12 light source, highly-accurate correction of gray color becomes possible, so long as different mixing ratio estimation equations are used. However, even when the mixing ratio estimation equation for the F12 light source is applied to other three-band fluorescent lamps, a sufficient correction effect is achieved. A plausible reason for this is that, since illumination light originating from the three-band fluorescent lamps other than the F12 light source are more close to the illumination light originating from the D65 light source, in terms of a color state (i.e., a color temperature) as compared with the illumination light originating from the D12 light source, the amount of white balance correction is small, and an error is reduced accordingly.

Figure 14A:
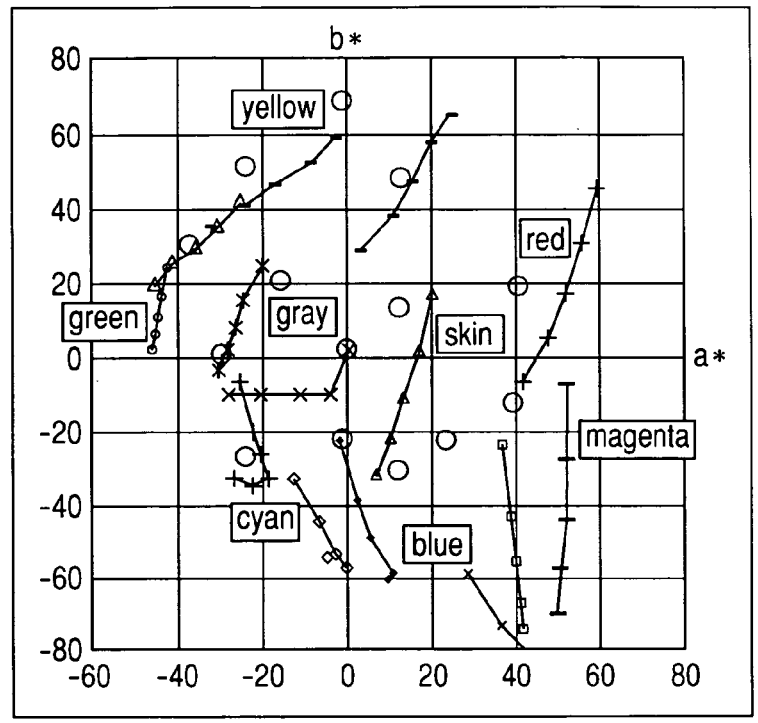
FIG. 14A is a view showing loci of colors reproduced when illumination light originating from an A light source is mixed with illumination light originating from a three-band day light color fluorescent lamp.
Figure 14B:
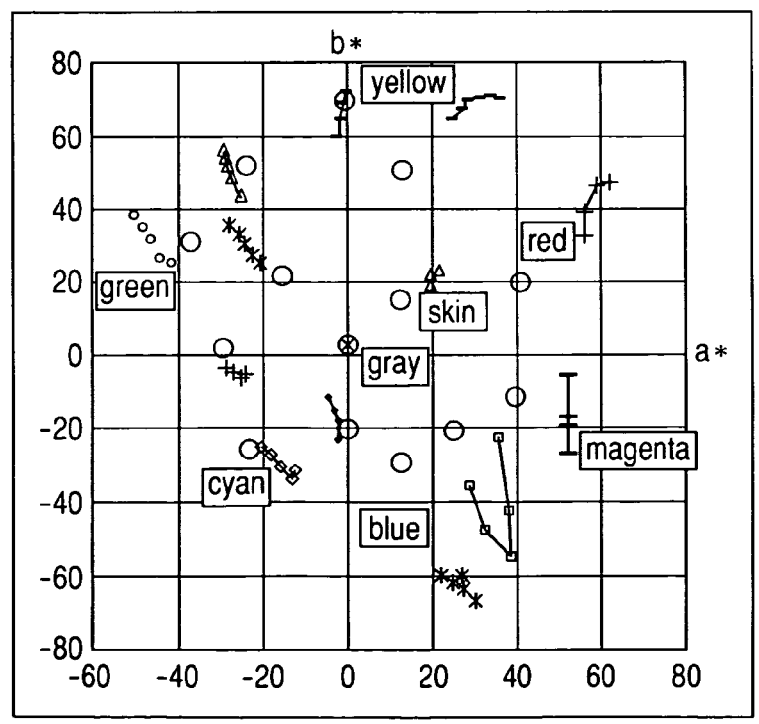
FIG. 14B is a view showing loci of colors reproduced after the colors have been subjected to correction through use of the estimated mixing ratio of the second embodiment.
Figure 15A:
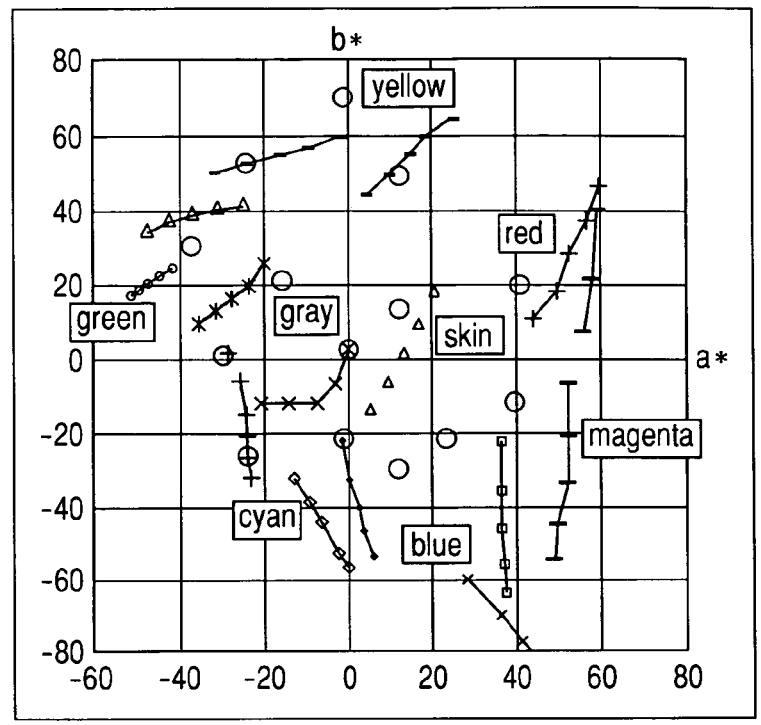
FIG. 15A is a view showing loci of colors reproduced when illumination light originating from the A light source is mixed with illumination light originating from an F10 light source.
Figure 15B:
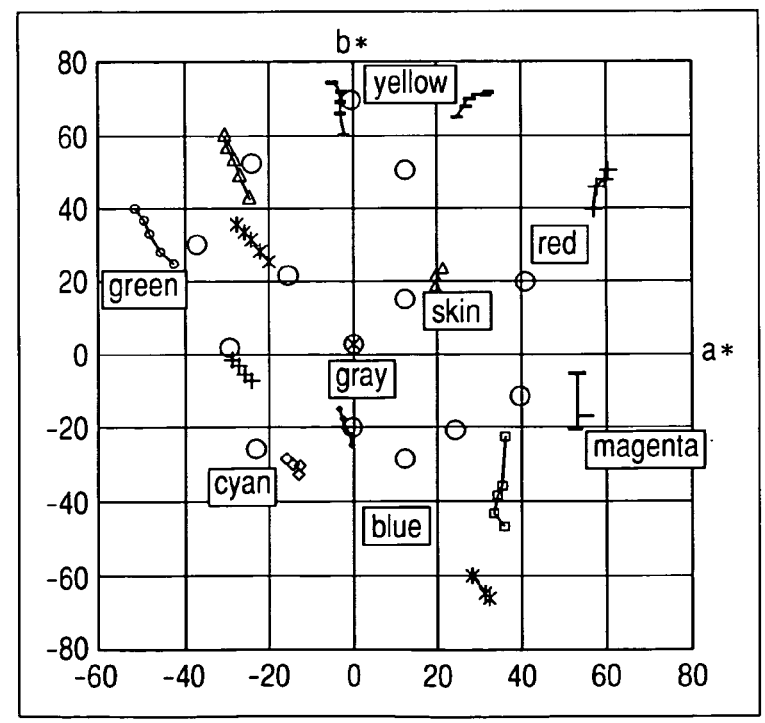
FIG. 15B is a view showing loci of colors reproduced after the colors have been subjected to correction through use of the estimated mixing ratio of the second embodiment.
Figure 16A:
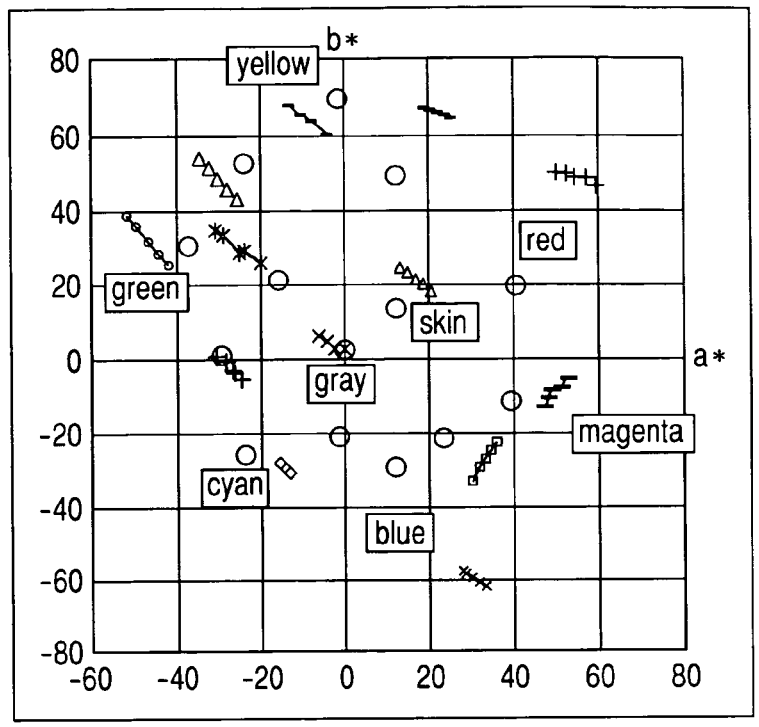
FIG. 16A is a view showing loci of colors reproduced when illumination light originating from the A light source is mixed with illumination light originating from an F12 light source.

FIGS. 14A and 14B are views showing a correction effect of the embodiment achieved when the illumination light originating from the three-band day light color fluorescent lamp and that originating from the A light source are mixed together. FIGS. 15A and 15B are views showing a correction effect of the embodiment achieved when the illumination light originating from the F10 light source of the three-band fluorescent lamps and that originating from the A light source are mixed together. Similarly, FIGS. 16A and 16B are views showing a correction effect of the embodiment achieved when the illumination light originating from the F12 light source and that originating from the A light source are mixed together.

The mixing ratio "m" employed when the illumination light originating from the three-band fluorescent lamp and that originating from the A light source is determined by $$m=38.37X^2-64.5X+26.96$$

($m=1$ signifies 100% of A light source, and the relation $X=R1/R2$ is assumed where m=1 when m>1,
m=0 when m<0, and
m=1 when R2=0.

Figure 16B:
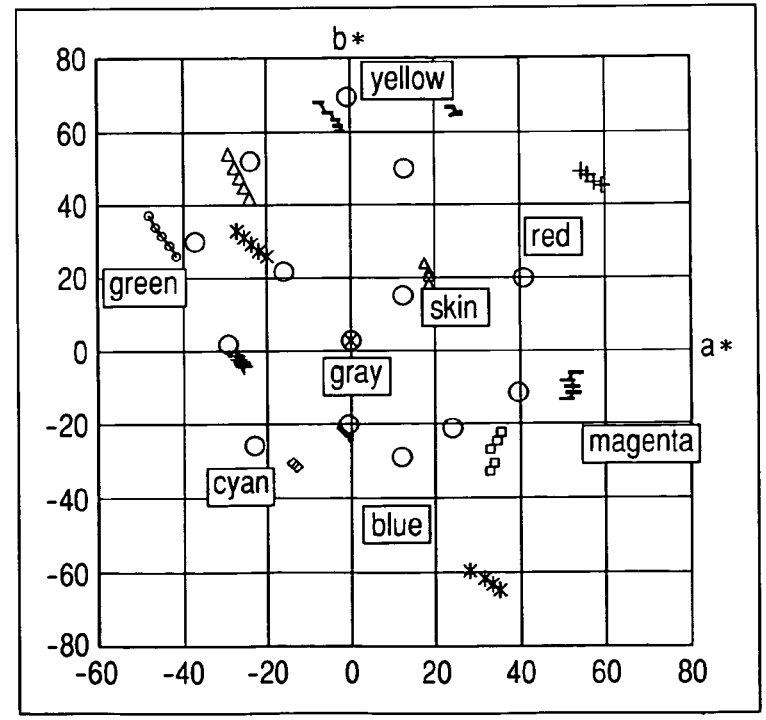
FIG. 16B is a view showing loci of colors reproduced after the colors have been subjected to correction through use of the estimated mixing ratio of the second embodiment.

As shown in FIGS. 14B, 15B, and 16B, when the illumination light originating from the three-band fluorescent lamp and that originating from the A light source are mixed together, color fogging of gray or flesh color is understood to be suppressed by means of subjecting the colors to white balance correction and color difference matrix correction through use of the mixing ratio "m" determined by the previously-described mixing ratio estimation equation.

The mixing ratio estimation equation employed when the illumination light originating from the three-band fluorescent lamp and that originating from the A light source are mixed together is for highly accurately correcting gray when the illumination light originating from the three-band day light color fluorescent lamp and that originating from the A light source are mixed together. In the case of a three-band fluorescent lamp (F10, F11, or F12 light source) other than the three-band day light color fluorescent lamp, perfect gray correction can be effected, so long as another equation is employed. However, a sufficient correction effect can be achieved even when the foregoing mixing ratio estimation equation is used as is. A conceivable reason for this is that the illumination light originating from the three-band fluorescent lamp other than that originating from the three-band day light color fluorescent lamp is more close to the illumination light originating from the A light source in terms of a color state (i.e., a color temperature) and, hence, an error is reduced accordingly.

The amount of white balance correction and color difference matrix correction conforming to the light source mixing ratio should preferably be determined on a per-pixel basis. However, when the sensors are uniformly, discretely disposed on the surface of the solid-state imaging device as in the case of the first embodiment, the amount of correction may be determined for each predetermined region centered on the position where the sensor is arranged, and the same amount of correction may be used for pixels belonging to the predetermined region.

Alternatively, among the discretely-arranged amounts of correction, the amount of correction may be determined on a per-pixel basis by means of interpolation of an adjacent amount of correction. With a view toward a reduction in noise contained in the amount of correction for each pixel, an average between the amount of correction of a pixel of interest and the amounts of correction of surrounding pixels may be taken as the amount of correction for that pixel.

Although the previous embodiments have taken a digital still camera as an example, the present invention can also be applied to another general digital camera, such as a digital video camera for shooting motion pictures.

According to the present invention, an image photographed while illumination light originating from a fluorescent lamp and illumination light originating from another light source are mixed together can be well subjected to white balance correction, whereby a photographed image—which has little color fogging and high color reproducibility—an be obtained. By means of this effect, illumination power of a flashing device to be attached to a camera can be set to a minimum level. Specifically, when the quantity of flash light is small, the quantity of available light relatively increases, and, as a result, color fogging becomes noticeable. However, the color fogging can be corrected by the effect of the present invention.

The entire disclosure of each and every foreign patent application from which the benefit of foreign priority has been claimed in the present application is incorporated herein by reference, as if fully set forth.

What is claimed is:

1. A solid-state imaging apparatus comprising:
a solid-state imaging device having a plurality of pixels that image light originating from a subject, by dividing the light into a plurality of color signals with a plurality of types of color filters provided with said plurality of pixels; and
a signal processor that subjects photographed image data output from the solid-state imaging device to white balance correction at a gain corresponding to plurality of light source types,
wherein the solid-state imaging device further comprises a plurality of sensors and a plurality of filters, each sensor associated with a respective filter, wherein each of the plurality of filters is different from said plurality of types of color filters and has a different transmission characteristic from those of said plurality of types of color filters, wherein the plurality of sensors detect light in a wavelength range which induces a difference having a predetermined value or more between radiant energy of a first light source and radiant energy of a second light source, the plurality of sensors being provided on the surface of the solid-state imaging device, wherein said plurality of filters are dispersed uniformly over the surface of the solid-state imaging device;
wherein the signal processor further comprises: a mixing ratio estimation unit that determines a mixing ratio between illumination light originating from the first light source and illumination light originating from the second light source, through use of a detection signal output from the plurality of sensors; and a gain computation unit that computes a gain where the white balance correction is to be effected, in accordance with the mixing ratio; and
wherein the plurality of sensors comprise two sensors, wherein peak sensitivity wavelengths for the sensors are substantially within 100 nm of each other.

2. The solid-state imaging apparatus according to claim 1, wherein the mixing ratio and the gain are determined with respect to each of the pixels.

3. The solid-state imaging apparatus according to claim 1, wherein the signal processor comprises:
a color tone correction unit for correcting a color tone by multiplying color difference signals determined from the photographed image data by a color difference matrix; and
a color difference matrix correction unit for correcting coefficients of the color difference matrix in accordance with the mixing ratio.

4. The solid-state imaging apparatus according to claim 1, wherein the signal processor comprises a light source type determination unit that determines the type of at least one of the first light source and the second light source from the photographed image data.

5. The solid-state imaging apparatus of claim 1, wherein said plurality of types of color filters are red (R), green (G), and blue (B) filters.

6. The solid-state imaging apparatus of claim 1, wherein the plurality of sensors are pixels of the solid-state imaging device which also image light originating from the subject.

7. The solid-state imaging apparatus of claim 6, wherein the plurality of sensors are adjacent pixels of the solid-state imaging device.

8. The A digital camera comprising:
a solid-state imaging device having a plurality of pixels that image light originating from a subject, by dividing the light into a plurality of color signals with a plurality of types of color filters provided with said plurality of pixels; and
a signal processor that subjects photographed image data output from the solid-state imaging device to white balance correction at a gain corresponding to a plurality of light source types,
wherein the solid-state imaging device further comprises a plurality of sensors and a plurality of filters, each sensor associated with a respective filter, wherein each of the plurality of filters is different from said plurality of types of color filters and has a different transmission characteristic from those of said plurality of types of color filters, wherein the plurality of sensors detect light in a wavelength range which induces a difference having a predetermined value or more between radiant energy of a first light source and radiant energy of a second light source, the plurality of sensors being provided on the surface of the solid-state imaging device, wherein said plurality of filters are dispersed uniformly over the surface of the solid-state imaging device;
wherein the signal processor further comprises: a mixing ratio estimation unit that determines a mixing ratio between illumination light originating from the first light source and illumination light originating from the second light source, through use of a detection signal output from the plurality of sensors; and a gain computation unit that computes a gain where the white balance correction is to be effected, in accordance with the mixing ratio; and
wherein the plurality of sensors comprise two sensors, wherein peak sensitivity wavelengths for the sensors are substantially within 100 nm of each other.

9. The digital camera of claim 8, wherein said plurality of types of color filters are red (R), green (G), and blue (B) filters.

10. A solid-state imaging apparatus comprising:
a solid-state imaging device having a plurality of pixels for imaging light originating from a subject, by dividing the light into a plurality of color signals with a plurality of types of color filters provided with said plurality of pixels; and
signal processing means for subjecting photographed image data output from the solid-state imaging device to white balance correction at a gain corresponding to a plurality of light source types,
wherein the solid-state imaging device further comprises a plurality of sensors and a plurality of filters, each sensor associated with a respective filter, wherein each of the plurality of filters is different from said plurality of types of color filters and has a different transmission characteristic from those of said plurality of types of color filters, wherein the plurality of sensors detect light in a wavelength range which induces a difference having a predetermined value or more between radiant energy of a first light source and radiant energy of a second light source, the plurality of sensors being provided on the surface of the solid-state imaging device, wherein said plurality of filters are dispersed uniformly over the surface of the solid-state imaging device;
wherein the signal processing means further comprise: mixing ratio estimation means for determining a mixing ratio between illumination light originating from the first light source and illumination light originating from the second light source, through use of a detection signal output from the plurality of sensors; and gain computation means for computing a gain where the white balance correction is to be effected, in accordance with the mixing ratio; and
wherein the plurality of sensors comprise two sensors, wherein peak sensitivity wavelengths for the sensors are substantially within 100 nm of each other.

11. The A digital camera comprising:
a solid-state imaging device having a plurality of pixels for imaging light originating from a subject, by dividing the light into a plurality of color signals with a plurality of types of color filters provided with said plurality of pixels; and
signal processing means for subjecting photographed image data output from the solid-state imaging device to white balance correction at a gain corresponding to a plurality of light source types,
wherein the solid-state imaging device further comprises a plurality of sensors and a plurality of filters, each sensor associated with a respective filter, wherein each of the plurality of filters is different from said plurality of types of color filters and has a different transmission characteristic from those of said plurality of types of color filters, wherein the plurality of sensors detect light in a wavelength range which induces a difference having a predetermined value or more between radiant energy of a first light source and radiant energy of a second light source, the plurality of sensors being provided on the surface of the solid-state imaging device, wherein said plurality of filters are dispersed uniformly over the surface of the solid-state imaging device;
wherein the signal processing means further comprise: mixing ratio estimation means for determining a mixing ratio between illumination light originating from the first light source and illumination light originating from the second light source, through use of a detection signal output from the plurality of sensors; and gain computation means for computing a gain where the white balance correction is to be effected, in accordance with the mixing ratio; and
wherein the plurality of sensors comprise two sensors, wherein peak sensitivity wavelengths for the sensors are substantially within 100 nm of each other.

12. The digital camera of claim 11, wherein said plurality of types of color filters are red (R), green (G), and blue (B) filters.

* * * * *